(12) United States Patent
Hashimoto et al.

(10) Patent No.: US 7,136,488 B2
(45) Date of Patent: Nov. 14, 2006

(54) MICROPROCESSOR USING ASYNCHRONOUS PUBLIC KEY DECRYPTION PROCESSING

(75) Inventors: Mikio Hashimoto, Kanagawa (JP); Kenji Shirakawa, Kanagawa (JP); Keiichi Teramoto, Tokyo (JP); Kensaku Fujimoto, Kanagawa (JP); Satoshi Ozaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 748 days.

(21) Appl. No.: 10/059,217

(22) Filed: Jan. 31, 2002

(65) Prior Publication Data

US 2002/0101995 A1  Aug. 1, 2002

(30) Foreign Application Priority Data

Jan. 31, 2001 (JP) .............................. 2001-024480

(51) Int. Cl.
*H04L 9/00* (2006.01)
*G05F 11/30* (2006.01)
*G05F 12/14* (2006.01)
*G05F 7/04* (2006.01)
*G05F 7/58* (2006.01)
*G05F 12/00* (2006.01)
*H04L 9/32* (2006.01)

(52) U.S. Cl. ................ 380/277; 713/189; 713/190; 713/191; 713/192; 713/193; 726/18; 726/19

(58) Field of Classification Search ........ 713/189–194; 365/185.04; 726/18–19; 380/277
See application file for complete search history.

(56) References Cited

U.S. PATENT DOCUMENTS 4,558,176 A    12/1985 Arnold et al.
5,224,166 A *   6/1993 Hartman, Jr. ............... 713/190
5,666,411 A     9/1997 McCarty
6,188,602 B1 *  2/2001 Alexander et al. ..... 365/185.04
2002/0101995 A1 8/2002 Hashimoto et al.

FOREIGN PATENT DOCUMENTS

EP    0 583 140    2/1994
EP    0 876 026    11/1998

OTHER PUBLICATIONS

David Lie, et al., "Architectural Support for Copy and Tamper Resistant Software", Proceedings of ASPLOS, Nov. 2000.
U.S. Appl. No. 10/059,217, filed Jan. 31, 2002, Hashimoto et al.
U.S. Appl. No. 10/948,313, filed Sep. 24, 2004, Hashimoto.
U.S. Appl. No. 10/913,537, filed Aug. 9, 2004, Hashimoto et al.

(Continued)

*Primary Examiner*—Ayaz Sheikh
*Assistant Examiner*—Longbit Chai
(74) *Attorney, Agent, or Firm*—Oblon, Spivak, McClelland, Maier & Neustadt, P.C.

(57) ABSTRACT

In a microprocessor that internally has a microprocessor specific secret key, a key management unit is provided to carry out a key registration for reading out from an external memory a distribution key that is obtained in advance by encrypting the instruction key by using a public key corresponding to the secret key, decrypting the distribution key by using the secret key to obtain the instruction key, and registering the instruction key in correspondence to a specific program identifier for identifying the program into a key table, and to notify a completion of the key registration to the processor core asynchronously by interruption when the key registration is completed.

7 Claims, 16 Drawing Sheets

OTHER PUBLICATIONS

U.S. Appl. No. 10/754,571, filed Jan. 12, 2004, Yamaguchi et al.
U.S. Appl. No. 10,608,113, filed Jun. 30, 2003, Yamaguchi et al.
U.S. Appl. No. 10/434,082, filed May 9, 2003, Isozaki et al.
U.S. Appl. No. 10/391,618, filed Mar. 20, 2003, Hashimoto et al.
Pending U.S. Appl. No. 09/984,717, filed Oct. 31, 2001.
Pending U.S. Appl. No. 10/214,197, filed Aug. 8, 2002.
Pending U.S. Appl. No. 10/259,379, filed Sep. 30, 2002.
Pending U.S. Appl. No. 10/028,794, filed Dec. 28, 2001.
Pending U.S. Appl. No. 10/781,158, filed Feb. 13, 2001.
Pending U.S. Appl. No. 09/781,284, filed Feb. 13, 2001.
Pending U.S. Appl. No. 09/984,407, filed Oct. 30, 2001.

* cited by examiner

MICROPROCESSOR USING ASYNCHRONOUS PUBLIC KEY DECRYPTION PROCESSING

BACKGROUND OF THE INVENTION

1. Field of the Invention

The present invention relates to a microprocessor capable of preventing illegal alteration of execution codes and processing target data under a multi-task program execution environment, and a multi-task execution method and a multi-thread execution method using such a microprocessor.

2. Description of the Related Art

In the open system that is widely spread today, information on hardware of a computer for general user such as PC and a system program called OS is disclosed, and any desired improvement can be made by modifying the system program.

Under such a circumstance, in order to guarantee the copyright protection for data handled by application programs or the copyright protection for programs themselves, there is a need for hardware based on the presumption that the OS of the system can carry out hostile operations with respect to applications. Such hardware has been proposed especially in a form of a microprocessor (see commonly assigned co-pending U.S. patent application Ser. Nos. 09/781,158 and 09/781,284; and Lie et al., "Architectural Support for Copy and Tamper Resistant Software", Computer Architecture News 28(5), pp. 168-). Such a microprocessor has a function for encrypting a program and data handled by that program under the multi-task environment in order to protect them from the peeping and the alteration. In the following, such a microprocessor will be referred to as a tamper resistant microprocessor.

A mechanism for protecting three elements (program, context, data) constituting an application program by encrypting them outside the processor has been disclosed in commonly assigned co-pending U.S. patent application Ser. Nos. 09/781,158 and 09/781,284. In this prior art, information on the three elements that are encrypted on an external memory will be processed in a decrypted state in a cache memory and processor registers inside the processor.

In order to protect information strictly, there is a need for a mechanism by which information read into the processor and maintained in a plaintext state as a result of the operation of a program A will not be read out by the OS or another program B.

Here, the first presumption is that the program is to be identified by an encryption key used in encrypting instructions of the program. For example, when one program A is encrypted by using an encryption key Ka, the basic requirement imposed on the tamper resistant microprocessor is that three elements (program, context, data) of the program A cannot be read out by a plaintext program B or a program C encrypted by using another encryption key Kc. For the program A, by distributing the program encrypted by using that encryption key Ka that is known only to the program provider and maintaining the encryption key Ka in secret, it is possible to distinguish the program A from the other programs of the other program providers. In the following, the encryption key Ka of instructions of the program A will be referred to as an "instruction key" of the program A.

As a mechanism for realizing this basic requirement, it is efficient to utilize the access control mechanism using a conventionally existing tag memory of the processor, as disclosed in commonly assigned co-pending U.S. patent application Ser. No. 09/984,407.

However, in the conventional system, the tag management is entrusted to the OS. Yet in the tamper resistant processor system, the tag management must be carried out by a hardware or software mechanism that is incorporated inside the processor in advance so that the alteration by the user is difficult, rather than by a software OS for which the alteration by the user is possible.

Such a mechanism is to be incorporated inside the processor so that it is preferable to make such a mechanism as simple as possible in order to make the processor inexpensive and make a processing of such a mechanism as simple as possible in order to make the overhead due to the tag management small. Also, the tag management must be carried out without causing any violation or contradiction in view of the above described basic requirement, regardless of whether the tag management is placed before or after the key value rewriting operation that becomes necessary in order to re-utilize tags which are finite resources.

Also, regarding the overhead, there is a viewpoint from a processing speed of the overall system and a viewpoint from a response time at a time of activating or switching the process, and it is required to make the overhead small from both of these viewpoints. In addition, conventionally, the public key decryption processing for acquiring a key for decrypting instructions and the decryption and execution of the program by using the acquired key have been carried out by a single instruction. In the general processor, the exception cannot be accepted during the execution of an instruction. For example, the 1024 bits public key decryption processing requires 1 msec or more time even by the currently fastest hardware. This is considerably longer than tens of μsec that is the required response performance of the real time processing generally used today, so that it can cause the lowering of the real time response performance of the system.

BRIEF SUMMARY OF THE INVENTION

It is therefore an object of the present invention to provide a microprocessor which is capable of improving the real time processing performance by shortening the unresponsive time due to the public key processing time at a time of the initial registration in the cache memory management procedure.

It is another object of the present invention to provide a microprocessor which is capable of realizing the safe management of tags used in the cache memory access control.

It is another object of the present invention to provide a microprocessor which has a program decryption function that can realize the efficient instruction execution while also making it difficult to estimate the program encryption key by chaining.

It is another object of the present invention to provide a microprocessor which is capable of improving the processing efficiency when a plurality of processes shares data encrypted by using the identical encryption key.

It is another object of the present invention to provide a microprocessor which has a context saving function that can meet the conflicting requirements regarding the convenience due to the safe program utilization and the security of the secret, according to the intention of a program provider.

According to one aspect of the present invention there is provided a microprocessor internally having a secret key specific to the microprocessor that cannot be read out to an external, the microprocessor comprising: a processor core configured to execute instructions of a program including plaintext instructions and encrypted instructions, the encrypted instructions being encrypted by using an instruction key specific to the program; and a key management unit configured to carry out a key registration for reading out from an external memory a distribution key that is obtained in advance by encrypting the instruction key by using a public key corresponding to the secret key, decrypting the distribution key by using the secret key to obtain the instruction key, and registering the instruction key in correspondence to a specific program identifier for identifying the program into a key table, and to notify a completion of the key registration to the processor core asynchronously by interruption when the key registration is completed, such that the key management unit carries out the key registration during execution of the program by the processor core in which execution of the encrypted instructions starts after the completion of the key registration is notified.

According to another aspect of the present invention there is provided a microprocessor internally having a secret key specific to the microprocessor that cannot be read out to an external, the microprocessor comprising: a processor core configured to execute instructions of a program including plaintext instructions and encrypted instructions, the encrypted instructions being encrypted by using an instruction key specific to the program; and a key management unit configured to carry out a key registration for reading out from an external memory a distribution key that is obtained in advance by encrypting the instruction key and a meta-level information integrally by using a public key corresponding to the secret key, decrypting the distribution key by using the secret key to obtain the instruction key and the meta-level information, and registering the instruction key and the meta-level information in correspondence to a specific program identifier for identifying the program into a key table.

Other features and advantages of the present invention will become apparent from the following description taken in conjunction with the accompanying drawings.

DETAILED DESCRIPTION OF THE INVENTION

Figure 1:
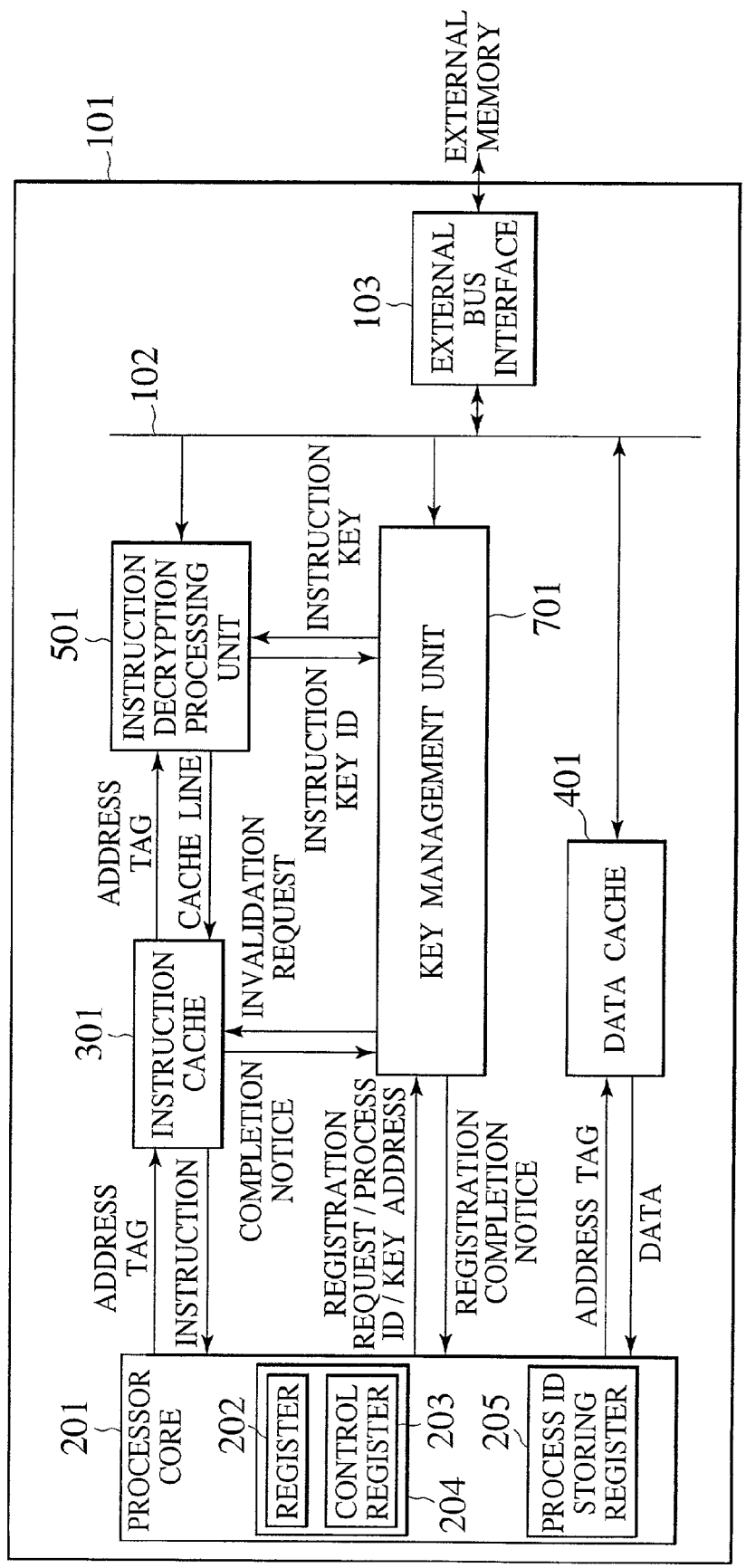
FIG. 1 is a block diagram showing an exemplary overall configuration of a microprocessor according to the first embodiment of the present invention.

Referring now to FIG. 1 to FIG. 5, the first embodiment of a microprocessor according to the present invention will be described in detail.

The first embodiment is directed to a safe and efficient management method for a key information (effective key identifier) to be used for the access control of information stored in a plaintext state inside the processor. In this embodiment, the key information management function is implemented by hardware, but it is also possible to implement the key information management function by firmware stored in a built-in ROM of the processor as long as the presumption that the alteration by the user is impossible can be guaranteed.

First, some terms used in the following description will be defined.

A term "encryption" refers to the encryption of plaintext information, including the encryption by a symmetric (common) key algorithm and the encryption by an asymmetric (public) key algorithm.

Similarly, a term "decryption" refers to the decryption of encrypted information into plaintext, including the decryption by a symmetric (common) key algorithm and the decryption by an asymmetric (public) key algorithm.

A term "cryptographic keys" refers to keys to be used for the encryption and the decryption defined above, including a key to be used for the encryption and a key to be used for the decryption.

A term "common key" refers to a key to be commonly used for the encryption and the decryption in the common key algorithm.

A term "encryption key" refers to a key to be used for the encryption in the public key algorithm.

A term "decryption key" refers to a key to be used for the decryption in the public key algorithm.

The microprocessor of this embodiment is provided with a decryption key (secret key, which will be denoted as Ks hereafter) that cannot be read out from the external. The encryption key (public key, which will be denoted as Kp hereafter) corresponding to the secret key Ks of the processor is disclosed to the public.

A term "encrypted program" refers to a program in which instructions are encrypted by using a certain common key (which will be denoted as Kx hereafter).

When some program creator creates an encrypted program, the program creator selects an appropriate common key Kx for encrypting the program and encrypts instructions of the program by using that key (but it is not absolutely necessary to encrypt the entire program).

In the processor of this embodiment, the identity of the program is judged by this common key Kx. This common key Kx will also be referred to as an instruction key of that encrypted program.

Then, a value obtained by encrypting the instruction key Kx by using the public key Kp of a target processor (which will be denoted as $E_{K_p}[Kx]$ hereafter) will be referred to as a distribution key. The program creator will distribute the program itself that is encrypted by using the instruction key, along with the distribution key, to a target system.

Also, the cryptographic key to be used in the cryptographic processing of the context information will be referred to as a context key, and the cryptographic key to be used in the cryptographic processing of data will be referred to as a data key.

In the decryption and encryption of information between a cache memory and a main memory, many types of cryptographic keys will be used for instructions, context and data. The common key to be used in the cryptographic processing of some specific cache line will be referred to as an effective key.

In the handling of the cryptographic algorithms in this embodiment, the distinction between the symmetric (common) key algorithm and the asymmetric (public) key algorithm is important, but differences among cryptographic schemes such as DES, Riandal, RSA, Elgamal, etc., within the category of the symmetric (common) key algorithm or the asymmetric (public) key algorithm are not important. Consequently, any of DES, Riandal, etc., can be used as the symmetric (common) key algorithm, and any of RSA, Elgamal, etc., can be used as the asymmetric (public) key algorithm.

A program comprises instructions and static data. In the encrypted program, the instructions are encrypted but the static data can be given by either ciphertext or plaintext.

A process refers to a state in which the program is currently executed or the execution of the program is interrupted under the multi-task environment managed by the OS of the target system. The process comprises instructions, an execution state and data. The data include static data and dynamic data. The execution of the process is carried out by reading the instructions of the program into the processor (after the decryption in the case of the encrypted program) and executing them. The execution of the process can be interrupted for reasons such as interruption. The OS saves a state maintained by that process inside the processor, which is given by the register information in general, as the execution state (which will also be referred to as a context information) in a memory outside the processor. In the case of resuming the execution of the process after the interruption service or the execution of another program, the execution state saved in the memory is read into the processor again and then the execution is resumed.

There can be cases where a plurality of processes created from a single program and executed simultaneously.

In the case of the encrypted program, it is possible to share the decrypted instructions among these processes which has the common origin.

Also, the access control for secret information of processes on the cache memory is carried out by using cache tags in the present invention, but it is also possible to use this access control mechanism together with the conventionally existing access control mechanism for processes in a virtual memory mechanism (UNIX kernel). The former mechanism that is newly introduced by the present invention is a mechanism for guaranteeing that a secret protection intended by a creator of an application program will be realized on the processor correctly. More specifically, this mechanism prevents reading of the instructions of one program by the other programs.

On the other hand, the latter mechanism is used for the purpose of correctly realizing an intended system management of the OS of the target system. More specifically, this mechanism aims at separating memory accesses of one process from the other processes in order to prevent interferences among their operations.

In the following, these two types of mechanisms will be referred to as an encryption attribute protection for processes and a memory region protection for processes, respectively. In this embodiment, both of these mechanisms are efficiently implemented by utilizing attributes called tags on the cache memory. As will be described below, regions for the encryption attribute protection and the memory region protection are provided in tags. In the case of distinguishing these two, they are referred to as an encryption attribute (protection) tag and a memory region (protection) tag. The cryptographic key to be used at a time of applying the cryptographic processing on some cache data is determined by the encryption attribute tag. The cryptographic key in this case will be referred to as an effective key with respect to the encryption attribute tag.

Note that the first embodiment is directed to the key management mechanism for the processor so that only the execution of the encrypted instructions will be described. The other aspects of the application program such as the execution state and the data encryption will be described in the second and subsequent embodiments.

(Programming Model)

First, a procedure for executing instructions of the encrypted program in the processor of this embodiment will be described in outline, and then a mechanism inside the processor for protecting secrets of the program will be described.

FIG. 1 shows an exemplary overall configuration of the microprocessor according to the first embodiment.

In FIG. 1, the microprocessor 101 comprises an internal data bus 102, an external bus interface 103 for exchanging data with an external memory (not shown), a processor core 201, an instruction cache 301 connected with the processor core 201, a data cache 401 connected with the processor core 201, an instruction decryption processing unit 501, and a key management unit 701 connected with the processor core 201, the instruction cache 301 and the instruction decryption processing unit 501. Note that FIG. 1 omits address buses although actually there are address buses.

In the first embodiment, only the instructions are encrypted and the data are not encrypted, so that only the instruction decryption processing unit 501 corresponding to the instruction cache 301 is provided. From the processor core 201, a cache tag containing an address and other attributes is outputted, and when the tag coincides, an instruction is outputted to the processor core 201.

[Execution of Plaintext Program]

The processor of this embodiment is capable of executing a program on the main memory in which plaintext instructions and encrypted instructions are coexisting.

Figure 2:
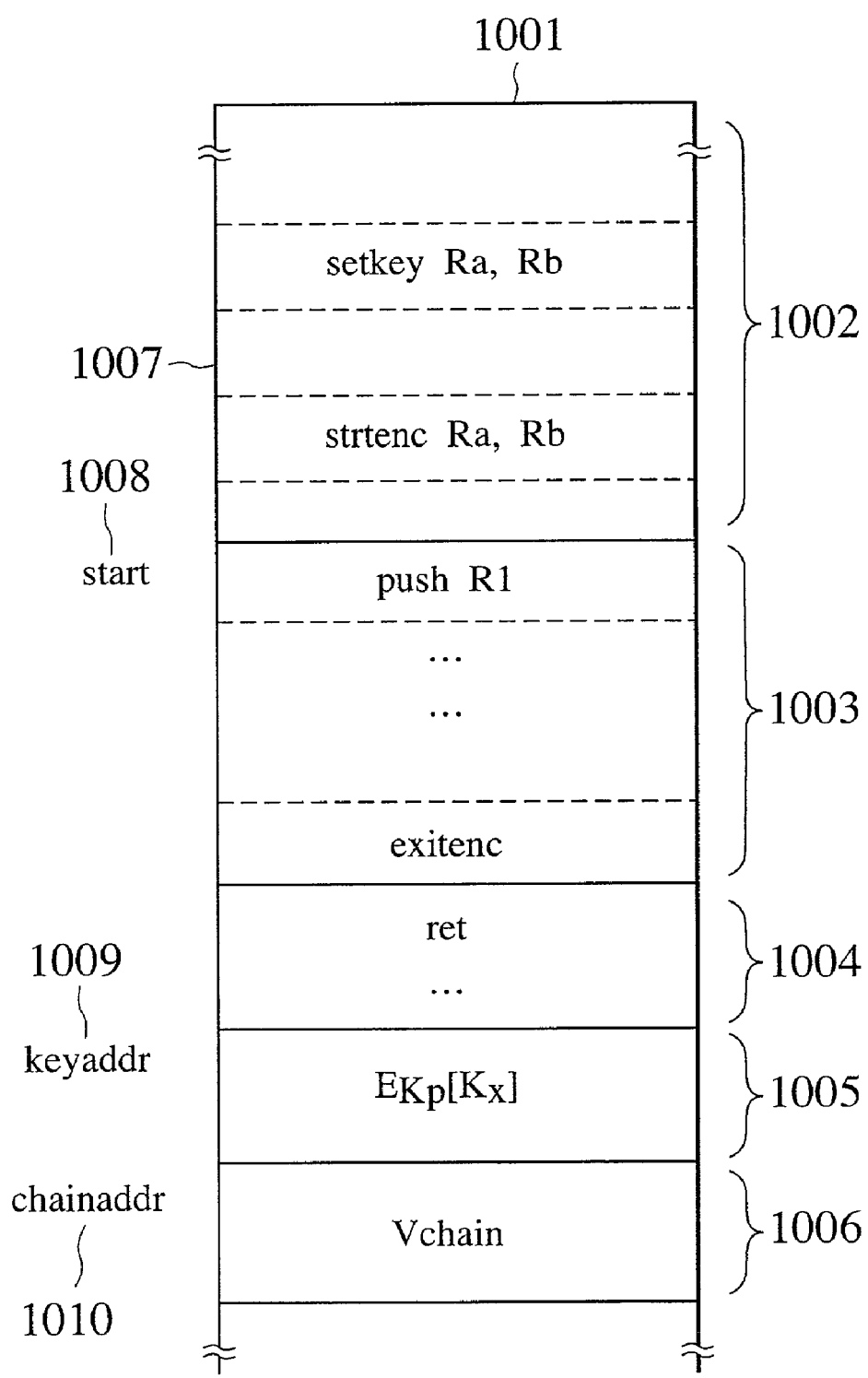
FIG. 2 is a diagram showing an exemplary arrangement of a program on a memory space that can be executed by the microprocessor of FIG. 1.

FIG. 2 shows an overall memory space 1001. A program is placed in regions 1002–1004 on the main memory. Regions 1002 and 1004 are plaintext regions, and a region 1003 is an encrypted region. A region 1005 stores a key information necessary for the decryption of the region 1003.

[Execution of Already Encrypted Instruction]

Next, the case of executing the encrypted instructions (which will be referred to as already encrypted instructions hereafter) will be described. The processor of this embodiment has two states of the plaintext instruction execution and the already encrypted instruction execution, and two types of instructions for controlling these two states are provided. One is an encryption execution start instruction for shifting from the plaintext instruction execution to the already encrypted instruction execution, and the other one is a plaintext return instruction which is a reverse of the encryption execution start instruction. In addition to these two, there is also a key registration instruction for registering the instruction key.

[Key Registration Instruction]

The key registration instruction is denoted by the following mnemonic "setkey" and takes two operands:

setkey Ra, Rb where Ra is an arbitrary register which is assumed to be storing an address of the distribution key of the program, and Rb specifies a process identifier.

The OS issues the "setkey" instruction using the address of the distribution key of the program as a parameter, as a preparation for the execution of the encrypted program. The processor which executed the "setkey" instruction will reads the distribution key, decrypts it by using the secret key specific to the processor to take out the instruction key, and register the instruction key inside the processor.

Next, the internal operation for the registration will be described.

Figure 3:
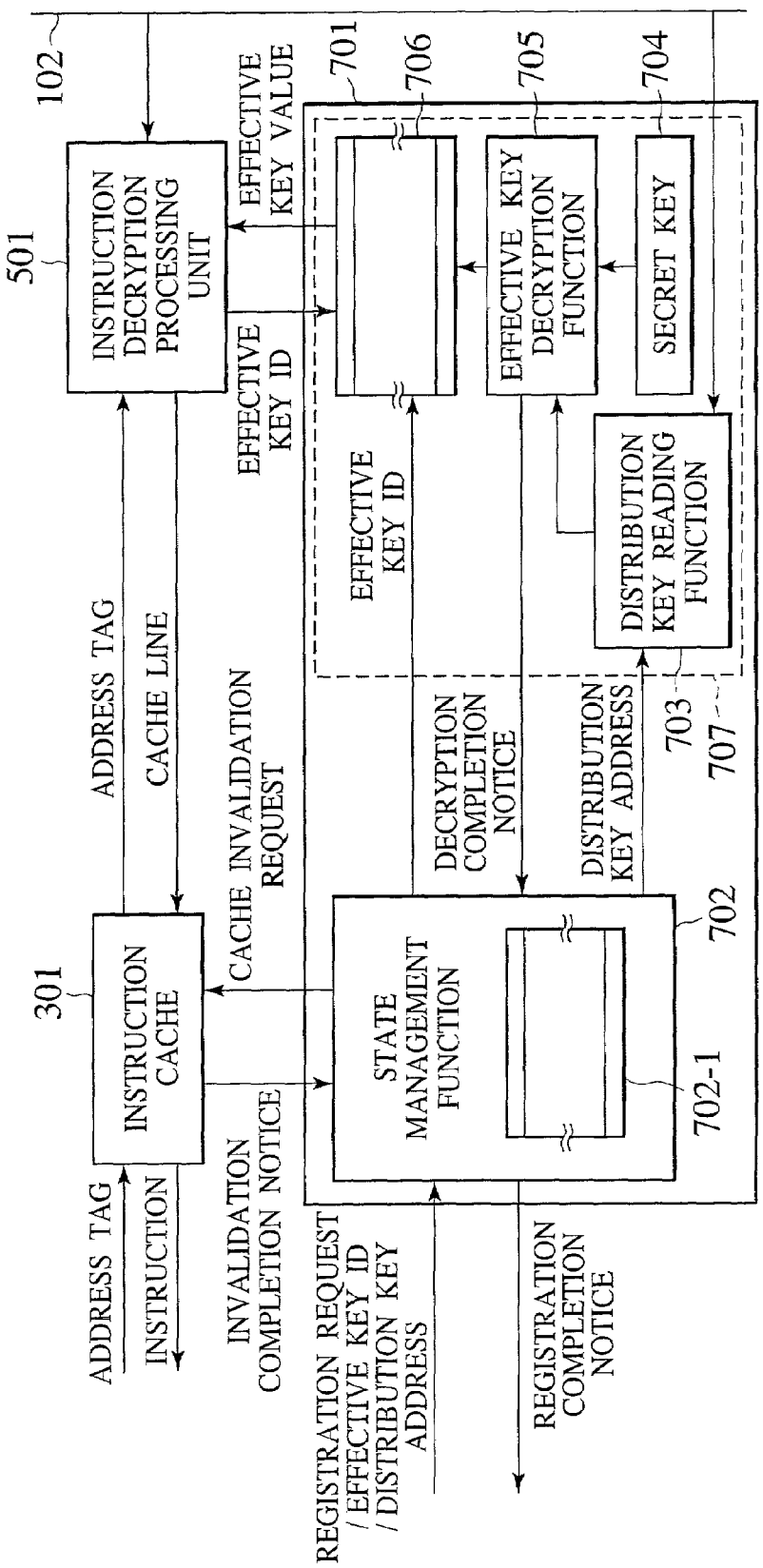
FIG. 3 is a block diagram showing an exemplary configuration of a key management unit in the microprocessor of FIG. 1.
Figure 4:
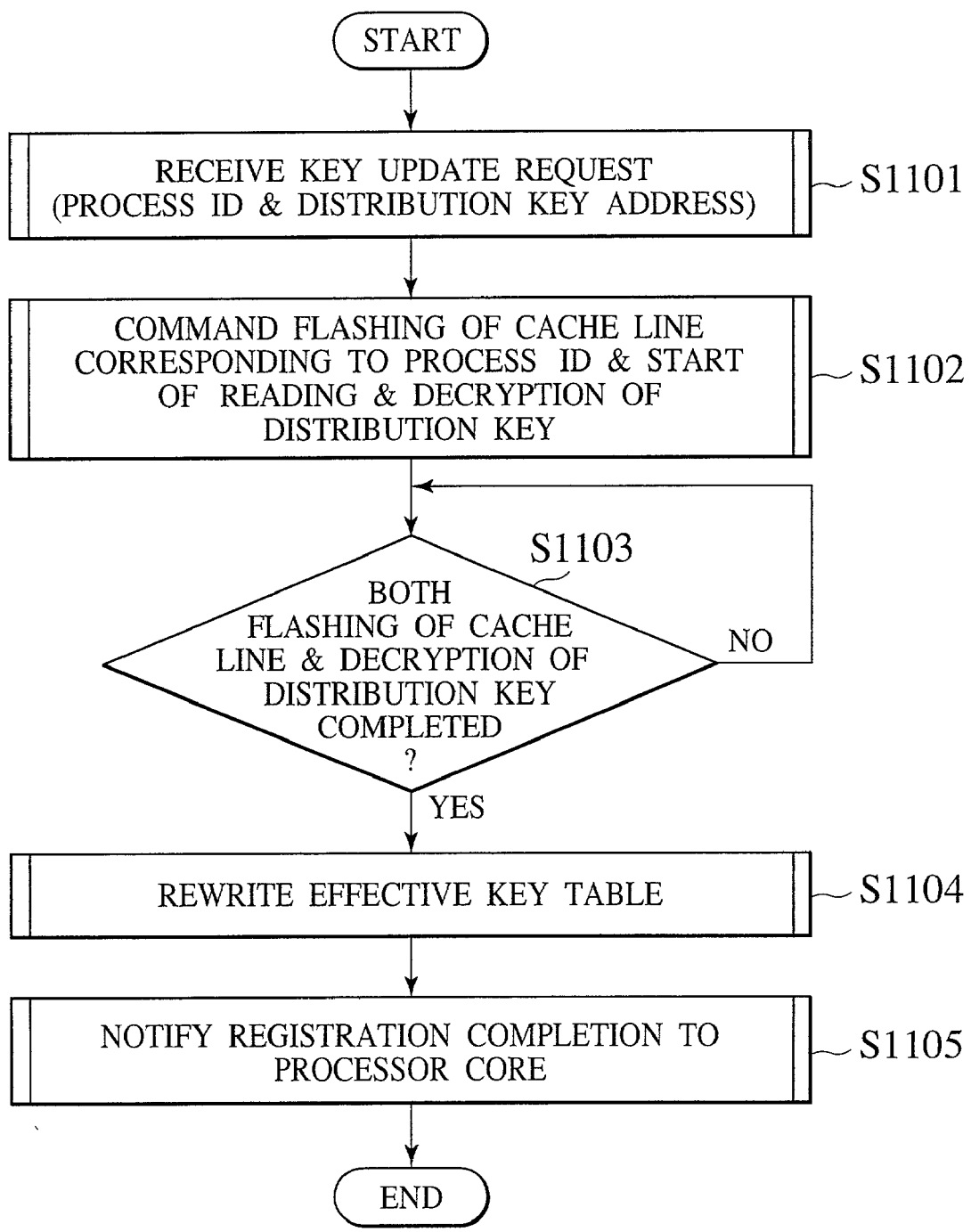
FIG. 4 is a flow chart showing an exemplary procedure for a key registration processing in the microprocessor of FIG. 1.

FIG. 3 shows an exemplary configuration of a key management unit and FIG. 4 shows an exemplary procedure for the key registration processing.

[Initialization and Registration of Key Table, Notification by Interruption]

When the "setkey" instruction is executed, the address of the distribution key and the process identifier are sent to a state management function 702 of the key management unit 701 (step S1101). This completes the execution of the "setkey" instruction and the subsequent instruction is to be executed next, but the registration operation is carried out in parallel by the key management unit 701 and when the registration is completed, this is notified to the processor core 201 as an interruption request.

The registration operation at the key management unit 701 is largely divided into two parts. One is the registration of the instruction key into the key table, and the other is the invalidation of a cache line that has the encrypted attribute tag with the process identifier (which is assumed to be #n) to be newly registered that exists on the instruction cache 301.

In the former operation, the state management function 702 sends the address of the distribution key received from the processor core 201 to a distribution key reading function 703, reads the distribution key from the external memory through the internal bus 102, and sends the distribution key to an effective key decryption function 705 (step S1102). The effective key decryption function 705 obtains the effective key by decrypting the distribution key by using a secret key 704 specific to the processor. This decryption is the decryption by the public key algorithm so that it requires a very large number of clocks extending over a plurality of instruction cycles. The effective key obtained as a result of the decryption is stored into an entry specified by the process identifier in an effective key table 706. When this operation is finished, the completion is notified to the state management function 702.

In parallel to this operation, the state management function 702 invalidates the cache entry having the attribute with the process identifier #n in the instruction cache 301 (step S1102). When this invalidation is completed, the completion is notified to the state management function 702 similarly.

The state management function 702 confirms the completion of both of these two operations (step S1103), and rewrites the key value of the corresponding entry in the effective key table 706 from an old value to the value obtained as a result of the decryption at the step S1102.

A process state management table 702-1 registers a key registration state (rewriting or registered) in correspondence to each process. The value of the entry corresponding to the process under the operation is set as rewriting during the key operation described above, and it is set as registered when the operation is completed. This value is read out by a reading request from the processor core 201 whenever necessary.

(Effect of Cache Invalidation)

When the instruction is to be executed by registering another effective key Kn different from the previously registered one with respect to one process identifier, if the cache line that was decrypted by using the previously registered effective key Ko exists in the instruction cache 301, the encrypted program that newly registered the effective key would become capable of executing instructions of the other encrypted program which should not be possible for this encrypted program so that it would become impossible to protect the secret of the encrypted program. In the present invention, it is possible to guarantee the protection of the secret of the encrypted program strictly by invalidating the cache line that has the attribute of the effective key to be registered by the key registration.

Also, regarding the public key decryption processing and the cache line invalidation that constitute the key registration which are operations that cannot be completed in one instruction cycle, by not executing these operations by a single instruction and notifying the completion of the registration by the interruption asynchronously, there is an effect of improving the system performance and the response performance by enabling the execution of another program or the response to another interruption request during the registration operation.

When these two operations are completed (step S1103 YES), the state management function 702 notifies the completion of the key registration to the processor core 201 by the interruption. It is also possible to provide an instruction for acquiring the key registration state such that the OS acquires the key registration state by polling. Upon receiving the key registration completion notice by the interruption, the OS starts the execution of the encrypted program (step S1105).

[Encryption Execution Start Instruction]

The encryption execution start instruction is denoted by the following mnemonic "strtenc" and takes two operands:

strtenc Ra, Rb where Ra is a register in which the address indicating a top of the encrypted instructions to which the control should be shifted is assumed to be stored by the OS, and Rb is a register in which the identifier of the earlier registered effective key is assumed to be stored by the OS. In this case, Ra stores a top address "start" (1008 in FIG. 2) of the encrypted instruction sequence, and #n is specified in Rb.

Besides that, there are also control registers for storing a storing address of an encryption chain vector and a top offset address of an encryption chain to be described below. A "chainaddr" (1010 in FIG. 2) is set in the encryption chain vector register, and a "start" (1008 in FIG. 2) is set in the encryption chain offset register.

When the "strtenc" instruction is executed, the effective key identifier #n is read into an effective key identifier storing register 202, and the execution of the encrypted program starts from the address "start".

[Decryption and Chaining of Instructions]

Next, the processing of the decryption and the chaining of the instructions will be described.

Figure 5:
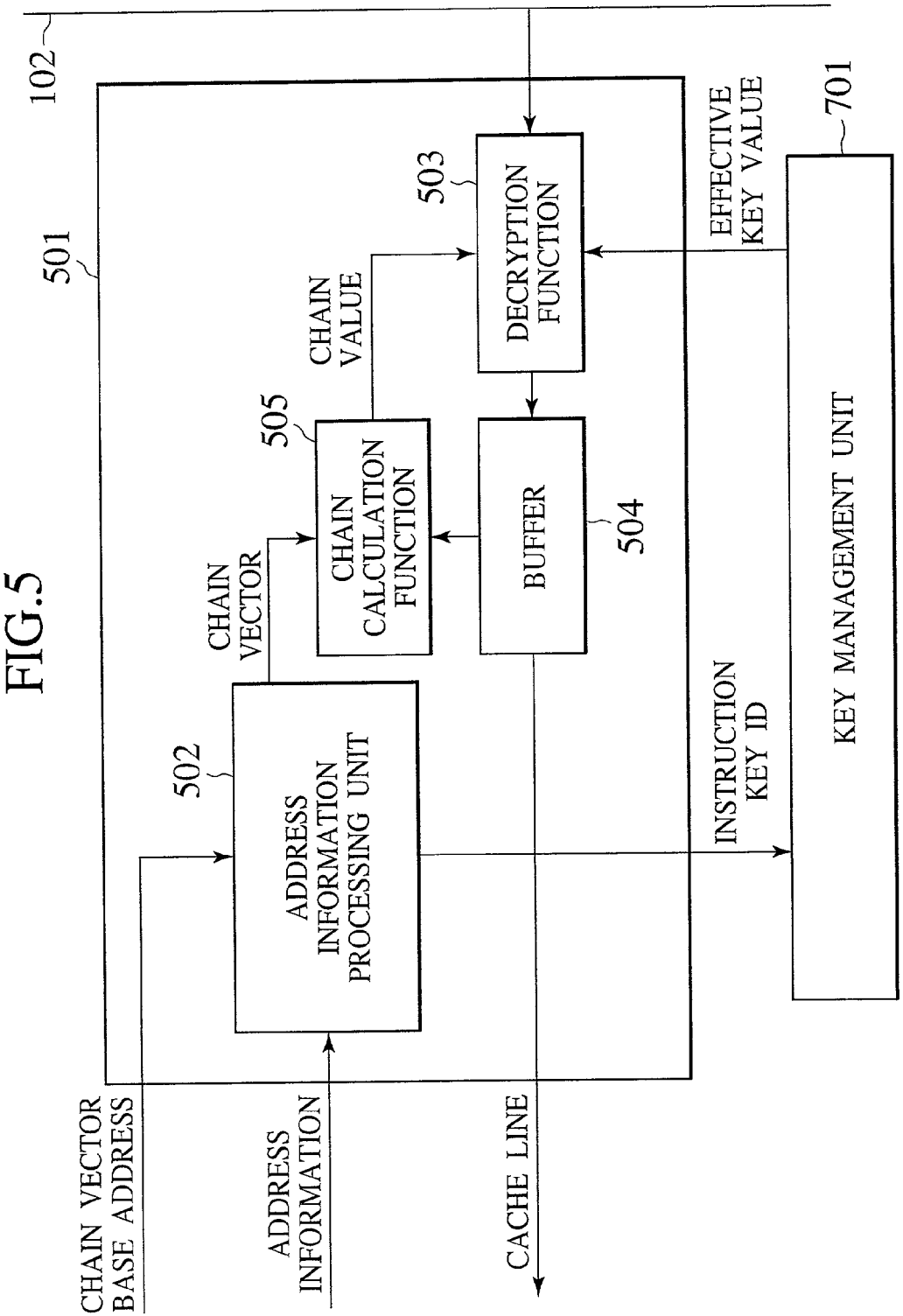
FIG. 5 is a block diagram showing an exemplary configuration of an instruction decryption processing unit in the microprocessor of FIG. 1.

FIG. 5 shows an exemplary configuration of the instruction decryption processing unit 501.

The processor core 201 sends the attribute information comprising the address "start", the memory region tag and the encryption attribute tag to the instruction cache 301 in order to read the instructions. When the cache does not hit, the address information is sent to the instruction decryption processing unit 501, and the encrypted program is read from the external memory, decrypted and read into the cache, An address information processing unit 502 receives the address information from the instruction cache 301. The memory address is sent to the external bus interface 103, and the corresponding data are read out from the external memory. On the other hand, the encryption attribute tag is sent to the key management unit 701. As a result, the effective key value is sent from the key management unit 701 to a decryption function 503, and the decrypted plaintext data are stored into a buffer 504.

Next, the chain vector will be described. The chain vector is a vector formed by a series of one bit values each taking a value "0" or "1" that indicates whether the chaining is used for the encryption or not for each cache line which is the encryption block. The chain vector is placed at a location specified by a chain vector address storing register of the processor. The top bit corresponds to the cache line specified by a chain base address register. When the bit corresponding to one cache line is "1", it indicates that this cache line has a chain relationship with an immediately previous cache line.

The top of the program cannot have a chain, so that the top bit always takes a value "0". When the program is executed sequentially from the top, the chain is sequentially calculated at the instruction decryption processing unit 501 (a chain calculation function 505) and the decryption becomes possible.

However, the program also has a branch point or an entry point. It is preferable to set "0" for the entry point or the global branch point of the program. If all the chain attributes except for the top have values "1" for one program, the decryption of that cache line by branching to a portion corresponding to the last of the program will cause a large overhead because it is necessary to calculate all the chains from the top of the program.

When the reading of the encrypted program into the cache memory starts from a middle of the chains, the decryption processing function reads the previous cache lines until the chain attribute becomes "0", sequentially calculates the chain values only, discards the read data, and eventually decrypts the target cache line and sends it to the instruction cache 301.

In this embodiment, by providing the chain vector and the decryption processing function corresponding to the chain vector, both the improvement of the cryptographic strength due to the chaining and the improvement of the processing efficiency in the branching are achieved.

[Reading into Instruction Cache]

When the decrypted cache line is stored into one entry of the instruction cache 301, a tag information containing the effective key identifier in its tag region is written. If that process accesses the same address again before the cache is flashed, the cache will hit and the plaintext data on the cache will be read out.

[Processing in the case of Non-coincidence of Key Attributes]

Now, in this embodiment, even when the address of the cache tag coincides with the requested address, if the process identifier of the currently executed program is different from the effective key identifier of the cache tag, it is not regarded as a cache hit. Instead, the cache line that is decrypted by using the currently valid effective key will be newly read and executed.

Here, the writing will not be carried out because the processing target is the instruction cache, but when the similar non-coincidence occurs in the data cache as in the second and subsequent embodiments to be described below, if the writing into that cache line is carried out and if "dirty flag" is set, the cache is flashed once, the data on the main memory are written back to the external memory (after encrypting them by using the common key used at a time of initial reading), and then read again after decrypting them by using the currently valid common key.

In this way, when the encryption attributes do not coincide in the cache access, the processing for reading that instruction or data from the external memory again by using the currently valid encryption attribute is carried out so that the exception will not occur. This operation is exactly the same as in the case where that cache line is not read at all from a viewpoint of the currently executed program because, if that cache line is not read at all, the instruction decrypted by using the currently valid encryption attribute will be read from the external memory (but there is no guarantee that it will be executed correctly).

[Plaintext, etc.]

Note that the instruction key identifier "0" is used for the execution of the plaintext program. When there is a request for the decryption key value for the instruction key identifier "0" from the decryption processing function, the key management unit 701 returns a predetermined value indicating that the decryption is not to be carried out.

Also, while the key registration processing with respect to one effective key identifier #x is carried out, the access to the cache entry having a tag #x in the instruction cache 301 from the processor core 201 is prohibited.

Figure 6:
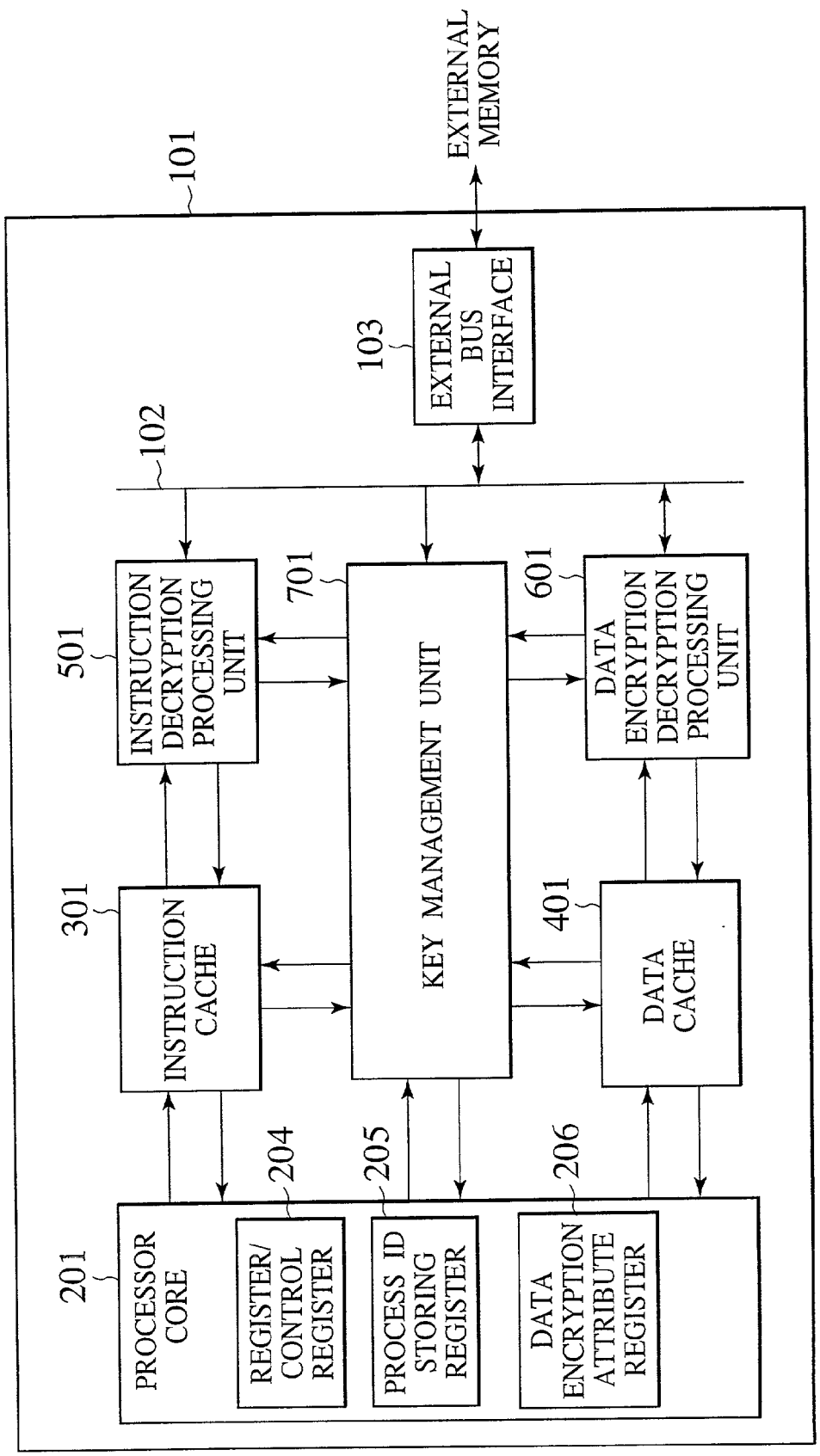
FIG. 6 is a block diagram showing an exemplary overall configuration of a microprocessor according to the second embodiment of the present invention.
Figure 7:
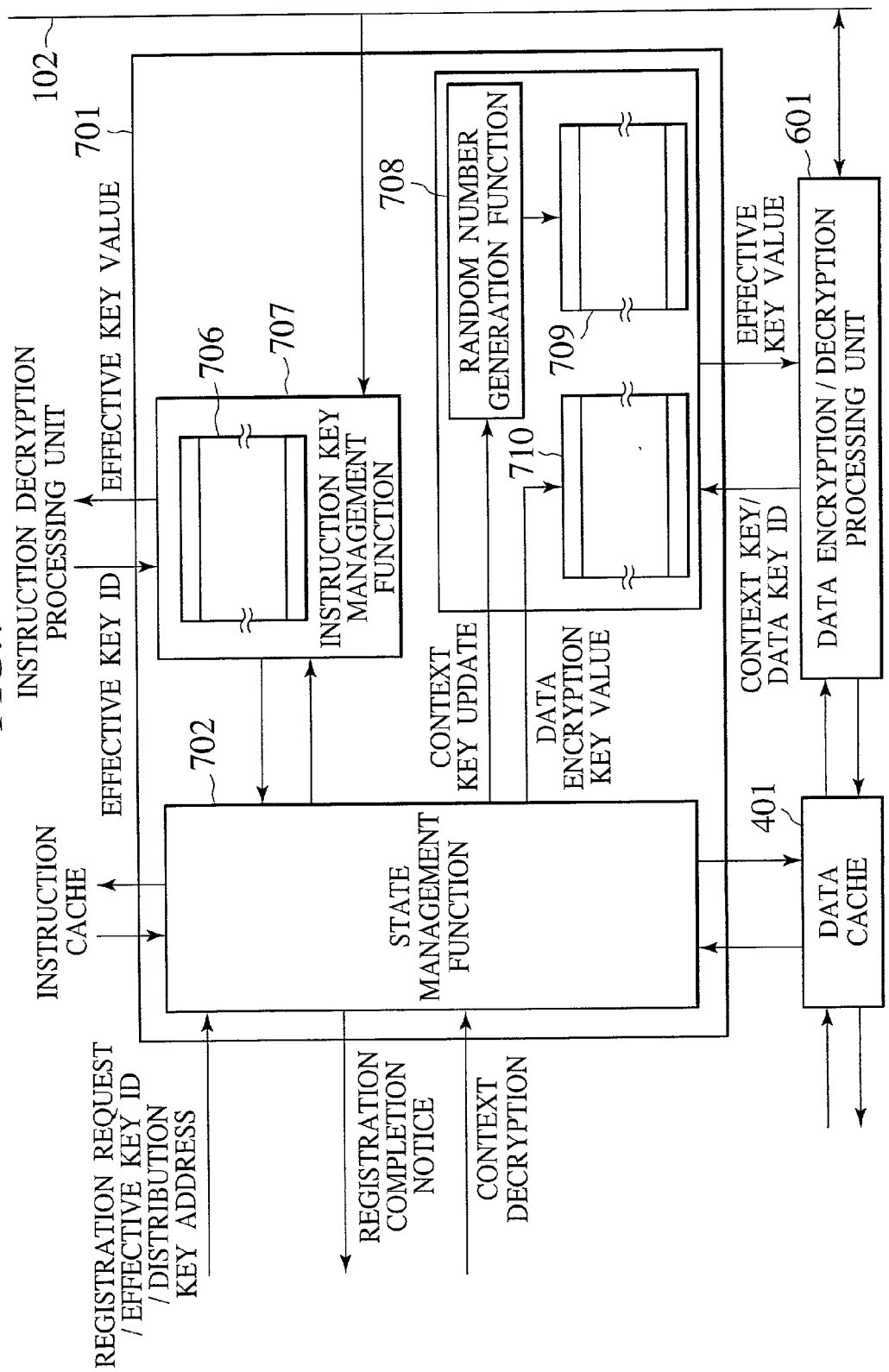
FIG. 7 is a block diagram showing an exemplary configuration of a key management unit in the microprocessor of FIG. 6.

Referring now to FIG. 6 and FIG. 7, the second embodiment of a microprocessor according to the present invention will be described in detail.

In the first embodiment, the asynchronous key registration processing for improving the response performance of the system and the efficient and safe key management method for the case of encrypting only the instructions are mainly described. In the second embodiment, an efficient and safe cryptographic key management scheme for the context and the data in addition to the instructions will be described. In the following, the differences from the first embodiment will be mainly described.

FIG. 6 shows an exemplary overall configuration of a microprocessor according to the second embodiment. The configuration of FIG. 6 differs from that of FIG. 1 of the first embodiment in that a data encryption/decryption processing unit 601 is additionally provided, and a data encryption attribute register 206 is added in the processor core 201.

FIG. 7 shows an exemplary configuration of the key management unit 701 in the second embodiment. The configuration of FIG. 7 differs from that of FIG. 3 of the first embodiment in that a context key table 709 and a data key table 710 are provided in addition to the instruction key table 706.

The context key table 709 is provided with a region for storing one common key in correspondence to each process identifier, such that a region 709-i corresponds to the process identifier i. Also, the data key table 710 is provided with regions for storing two common keys in correspondence to each process identifier, such that regions 710-i-1 and 710-i-2 correspond to the process identifier i.

In order to identify these effective keys on the cache, the encryption attribute tag has two additional bits such that the effective key can be determined by a combination of the process identifier and a type field in two bits.

Here, a term effective key table refers to a table for storing key values in general, and the instruction key table, the context key table, and the data key table refer to the effective key tables in which the stored keys are the instruction keys, the context keys, and the data keys, respectively. In the first embodiment, a table for storing the instruction keys has been referred to as the effective key table, but in the second and subsequent embodiments, the instruction key table, the context key table and the data key table will be used in order to distinguish these three types of tables.

(Instruction Key Registration, Instruction Execution Start)

In order to execute the encrypted program, the instruction key is registered into the instruction key table 706 first. The procedure for registering the instruction key is basically the same as in the first embodiment, and the invalidation of the instruction cache 301 in conjunction with the key re-assignment described above is also carried out.

Here, however, the internal operation at a time of the key registration is different in order to guarantee the independency of the context key and the data key for each process. Namely, simultaneously with the registration of the instruction key, the initialization of the entry specified by the process identifier is also carried out for the context key table 709 and the data key table 710. For example, when the instruction key for the process identifier i is registered, values of the context key table region 709-i and the data key table regions 710-i-1 and 710-i-2 are initialized to values corresponding to the prescribed plaintext access. Here, in addition to the initialization of values, the flashing of the data cache lines which have these effective key identifiers is also carried out.

If there are any data which have not been written back to the external memory, they are written back to the external memory from the cache. At this point, the old values of the context key and the data key are necessary in order to write back the cache data, so that there is a need to maintain the old values of the context key and the data key until the flashing is completed.

When the registration of the instruction key corresponding to the process identifier, the initialization of the context key and the data key, and the flashing of the instruction cache and the data cache are completed, the state management function 702 notifies the registration completion to the processor core 201.

(Instruction Execution Start)

The procedure for starting the instruction execution is the same as in the first embodiment, except for the context information protection processing and the data encryption processing at a time of the exception occurrence.

First, the data encryption processing at a time of the exception occurrence will be described. The data encryption function can be used only by the encrypted process. The data encryption function is controlled by the data encryption attribute register, but a valid bit of the data encryption attribute register is cleared at a time of the start of the execution of the encrypted program. Also, before changing the encryption attribute, the valid bit must be cleared once. When the valid bit is cleared, the all the cache entries having the corresponding tags will be flashed.

In order to use the data encryption function, the encryption attributes of the data encryption attribute register are set. The encryption attributes comprise a starting address, a target region length, and a data key. The valid bit is set by writing these parameters into the data encryption attribute register. Then, the registration of the data key into the data key table and the construction of an address-data key identifier conversion table are carried out.

The registration of the data key only requires to write a value of the data key into an entry specified by the process identifier and the auxiliary information of the data key table. At this point, all the corresponding cache lines are flashed so that there is no need to newly wait for the flashing of the cache.

In parallel to the registration of the data key, the construction of the address-data key identifier conversion table is carried out. The address-data key identifier conversion table is provided in a memory management function (not shown) inside the processor. A table for establishing a correspondence between a data key identifier to be used and an address range is constructed according to the starting address and the target region length information of the data encryption attribute register. Then, all the data cached in the encryption target range will be flashed.

When the execution of the instruction for setting the valid bit is completed, the data encryption function becomes a valid state so that all the read and write with respect to memories of the regions specified by the data encryption attribute register will be carried out in encrypted forms.

The writing into the cached memory will be carried out in a plaintext state, but a tag of the corresponding data key identifier will be added. When that line is to be flashed, the data key identifier is sent to the key management unit 701 and the data key retrieved from the data key table 710 is written into the data encryption/decryption processing unit 601 such that the data will be written into the memory in an encrypted form.

It should be noted that the content of the external memory corresponding to the same cache line will be entirely rewritten by the encryption even in the case of the rewriting of only one bit data.

The series of processing will be carried out in an reverse order in the case of the reading.

Only the address-data key identifier conversion table that corresponds to the currently executed process will be maintained in the processor core. When the process to be executed is switched, the address-data key identifier conversion table will also be re-constructed. However, in the case of the process switching, there is no need to carry out the flashing of the cache because the value of the key corresponding to the same data key identifier will remain unchanged before and after the switching.

On the other hand, the data key table maintains the data keys of all the encrypted processes, because the cache line to be flashed is not necessarily that which has the tag of the currently executed process.

By the data key management function described above, the safety and the consistency of the data can be guaranteed even when there is a process switching or a change in the data encryption target address or the data encryption key, so that the efficient data encryption can be realized at the same time.

Next, the context protection processing at a time of the exception occurrence will be described.

When the exception occurs during the execution of the encrypted instruction, the content of the register is saved to a register buffer, and after the subsequent registers are initialized, the processing of an exception handler is started. At a time of saving of the register, the process identifier is also saved to the register buffer. The register buffer is provided with a valid flag, which is set to 1 when the exception occurs during the execution of the encrypted program. The register buffer cannot be read from the other programs so that the content of the register that is being processed by the encrypted program will not be read out by the exception handler.

The exception handler saves the register information of the interrupted program that is saved in the register buffer, to the cache memory by a context saving instruction to be described next.

The context saving instruction (savereg) is denoted by the following format, and takes one operand:

savereg dest where the operand "dest" indicates an address at which the content of the register buffer is saved. When the "savereg" instruction is issued, the content of the register buffer is written into the cache line corresponding to the address "dest". In the ordinary data writing into the memory, the data encryption attribute of the process that issued the write instruction is to be used as described above, but in the case of the writing by the context saving instruction, the context key identifier of the process saved in the register buffer is to be used as a tag to be used for access.

The context is saved in a plurality of cache lines, and the chain bit is set. By chaining, the safety of the secret of the context can be improved.

The handling of the context key is considerably different from that of the instruction key and the data key. A value of one context key is determined by a random number generator device. Then, at a time of resuming the execution of that process, it is maintained inside the processor until the context is decrypted and discarded when the decryption is completed.

The context key of one process is maintained inside the processor and cannot be read out to the external. By using a high performance random number generator device with a such as a physical random number generator device, it is possible to reduce a possibility for having the same key used and make it extremely difficult to guess the key sequence.

By these mechanisms, it is possible to improve the safety by making it extremely difficult to carry out attacks such as that for forging the context information of one process and changing the operation of the process or that for analyzing the context information.

In addition, the context information encryption mechanism can be used commonly as the data encryption mechanism so that it is possible to provide the processor inexpensively.

When the execution of the encrypted process is to be resumed, the following "rcvrreg (recover register)" instruction will be issued:

rcvrreg Ra, Rb which takes two register operands including Ra that indicates an address of the saved context and Rb that specifies the process identifier.

The processor core that executed this instruction will issue the memory read request to the data cache by attaching a tag indicating the context key of the process identifier. If there remains any context information that has been saved in the data cache, that context information is read out as it is and recovered to the register, and the execution of the process is resumed in that state.

If the context information has been flashed, the decryption function requests the context key of the process to the key management function, and the context key read out from there is used for the decryption, the context information is read into the data cache in a plaintext state, the register information is recovered, and the execution of the process is resumed.

Even if the other process attempts to read the context information that exists on the data cache in the plaintext form, the tags will not coincide so that the reading cannot be carried out and the context information can be maintained safely.

Referring now to FIG. 8 to FIG. 13, the third embodiment of a microprocessor according to the present invention will be described in detail. In the following, the differences from the second embodiment will be mainly described.

The third embodiment is directed to the case of realizing the fast processing for the shared memory. For the realization of the inter-process communications, some kind of shared memory is used in many cases. By sharing the data key according to a safe key exchange method between two processes using the mechanism of the second embodiment, it is possible to realize the efficient and safe inter-process communications utilizing the cryptographic function of the processor.

However, the mechanism of the second embodiment cannot share the cache line decrypted inside the processor among a plurality of processes without flashing it to the external memory. For example, suppose that a process A decrypted data by using a key Ka stored in a register D1 and read it into the data cache. This cache line will be given an encryption attribute (#a, D1). When another process B has the key Ka in the register D1 and refers to that cache line, the encryption attribute (#b, D1) of the memory access tag of that process does not coincide with the encryption attribute (#a, D1) of the cache line so that this cache line is flashed, such that it is written into the main memory after being encrypted by using the key Ka corresponding to the tag (#a, D1) once and then read into the cache after being decrypted by the key Ka corresponding to the tag (#b, D1) again.

This processing involves two unnecessary accesses to the main memory. In the following, a way of carrying out the efficient memory access by eliminating this overhead will be described.

Figure 8:
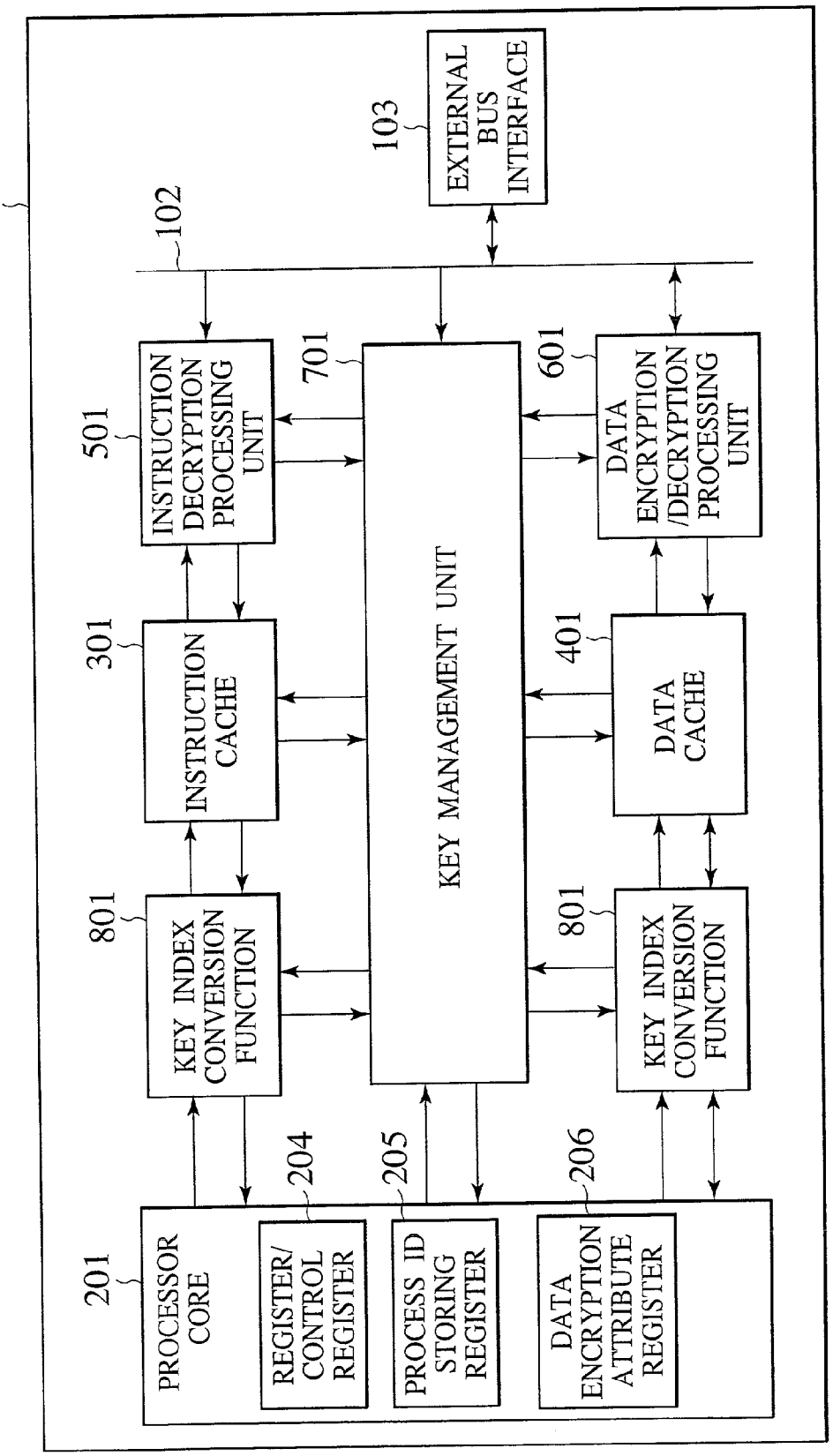
FIG. 8 is a block diagram showing an exemplary overall configuration of a microprocessor according to the third embodiment of the present invention.

FIG. 8 shows an exemplary overall configuration of the microprocessor according to the third embodiment. The configuration of FIG. 8 differs from that of FIG. 6 of the second embodiment in that a key index conversion functions 801 are provided between the processor core 201 and the cache memories 301 and 401.

Figure 9:
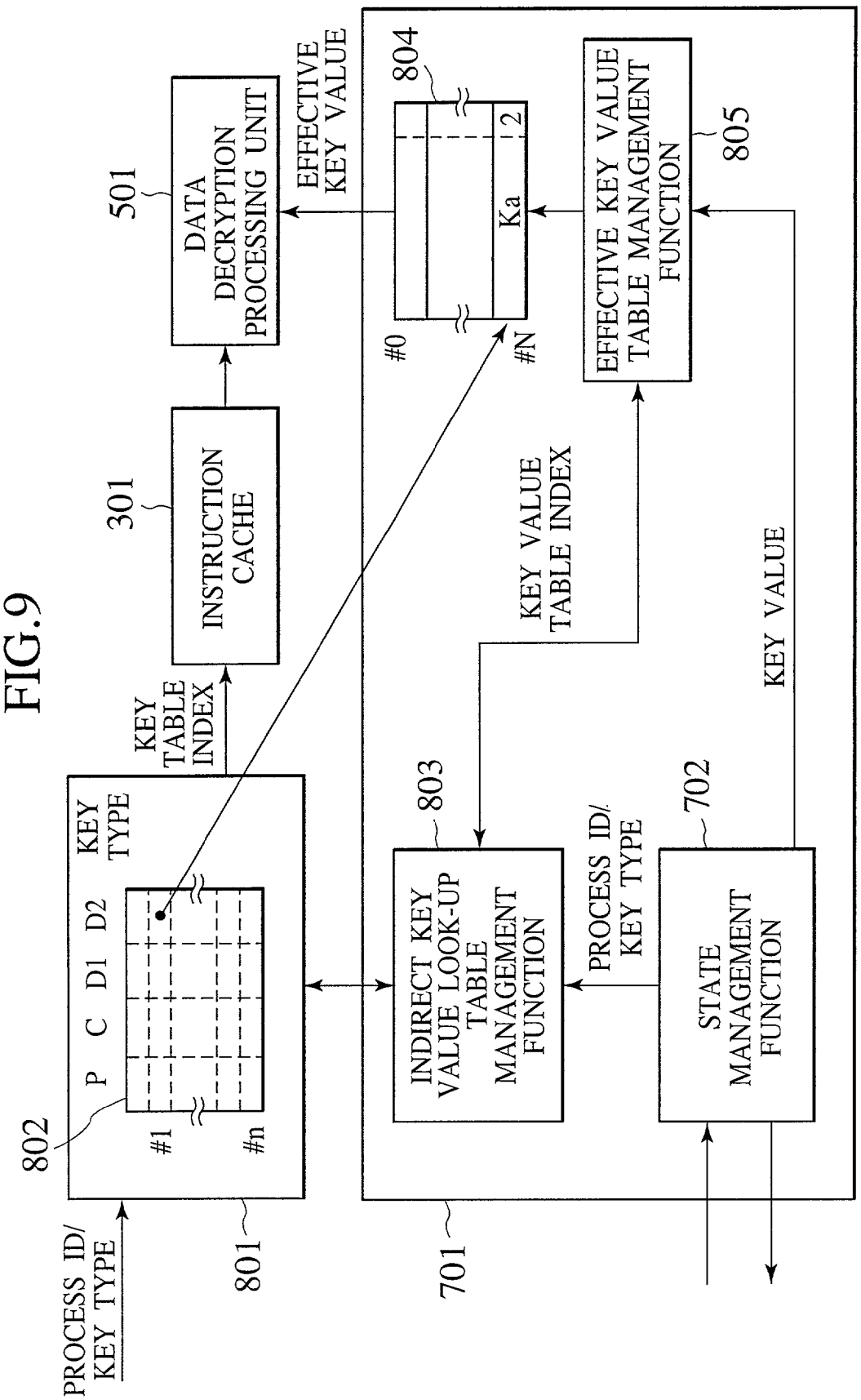
FIG. 9 is a block diagram showing an exemplary configuration of a key index conversion function and a key management unit in the microprocessor of FIG. 8.

FIG. 9 shows an exemplary configuration of the key index conversion function 801 and the key management unit 701. The key index conversion function 801 has an indirect key value look-up table 802 internally. The key management unit 701 has a key value table 804 for storing a value of the effective key internally. The indirect key value look-up table 802 is looked up by using the process identifier and a key type identifier, and stores an index to an entry of the key value table 804. In FIG. 9, the entry indexed by (#1, D2) in the indirect key value look-up table 802 stores an index to the entry #N of the key value table 804.

The management of the key value table 804 is carried out by an effective key value table management function 805. The effective key value table management function 805 carries out the registering or deleting processing such that the value of the key becomes unique within the table. The key value table 804 is also provided with a field for storing the number of times of the look up made with respect to the key value in order to judge whether the entry stores a valid key value or not.

Figure 10:
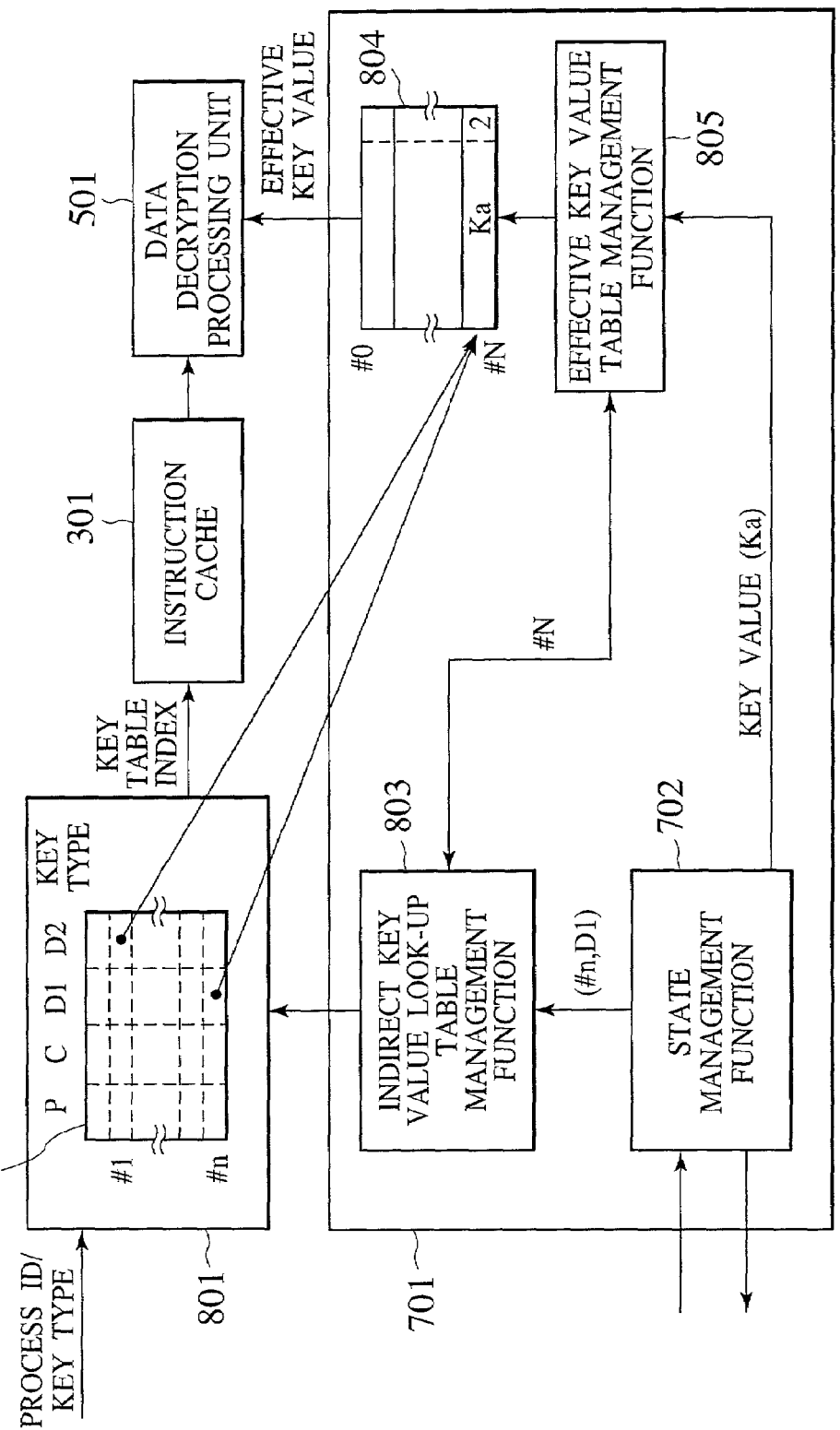
FIG. 10 is a diagram for explaining a key registration processing by the key index conversion function and the key management unit of FIG. 9.
Figure 11:
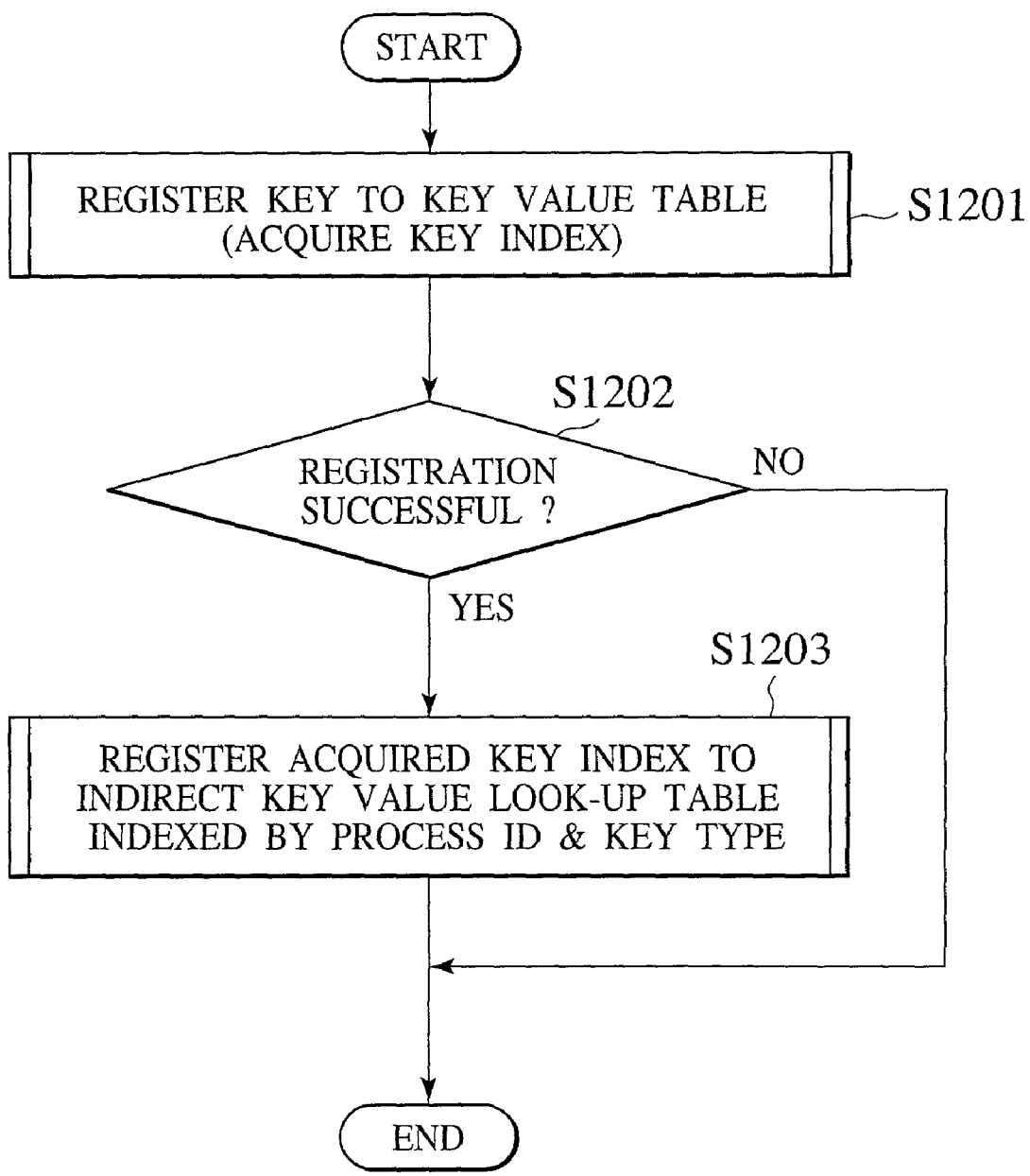
FIG. 11 is a flow chart showing an exemplary procedure for a key registration processing in the microprocessor of FIG. 8.

FIG. 10 shows an exemplary operation at a time of the key registration, and FIG. 11 shows an exemplary procedure for the key registration processing.

First, the process identifier, the key type, and the key value information are presented from the processor core 201 to the state management function 702. The key value is not necessarily presented directly, and in the case of the program key an address at which the distribution key is stored is presented, whereas in the case of the context key the key value is generated inside the key management unit 701.

The key value Ka is presented to the effective key value table management function 805. The effective key value table management function 805 searches the key value in the table, and registers a new value if there is no matching entry and increases a value of the look-up counter from 0 to 1 (step S1201).

Here, the key value Ka is registered in the entry #N so that a value of its look-up counter is increased from 1 to 2. It should be noted here that the uniqueness of the key value on the table is required in the case of sharing the cryptographic key. In order to guarantee the uniqueness, there is a need to search through values in the table, and this can be implemented by fast search method such as a method using a contents addressable memory (CAM) or a method using a parallel tree (AVL tree). If the key cannot be newly registered, this fact is notified to the state management function 702.

When the registration succeeds (step S1202 YES), the effective key value table management function 805 presents the index #N to the entry at which the key value is stored, to the indirect key value look-up table management function 803. Then, the indirect key value look-up table management function 803 has the process identifier and the key type (#n, D1) presented from the state management function 702 and stores the index #N of the key value into the entry indexed by them (step S1203). The completion of the storing is notified to the state management function 702.

(Key Value Look-up)

When the process #1 looks up by using the data key D2, the process identifier and the key type (#1, D2) are presented from the processor core 201 to the key index conversion function 801. The key index conversion function 801 looks up the indirect key value look-up table 801, converts these process identifier and key type into a tag #N corresponding to the key value index, and presents it to the data cache as a cache tag. In the case of the cache miss, the data cache reads the content of the external memory corresponding to the address, reads the data decrypted by using the key corresponding to the tag #N into the cache line, and adds the tag #N.

When another process #n looks up this cache line by using the data key D1, the tag outputted by the key index conversion function 801 will be the same #N, so that the decrypted cache line can be utilized without looking up the external memory. In order for different processes to utilize the same tag, a value of the key registered in the effective key value table must be the same, so that the process that does not know the key value cannot read out the decrypted data improperly.

(Key Entry Deletion Processing)

Figure 12:
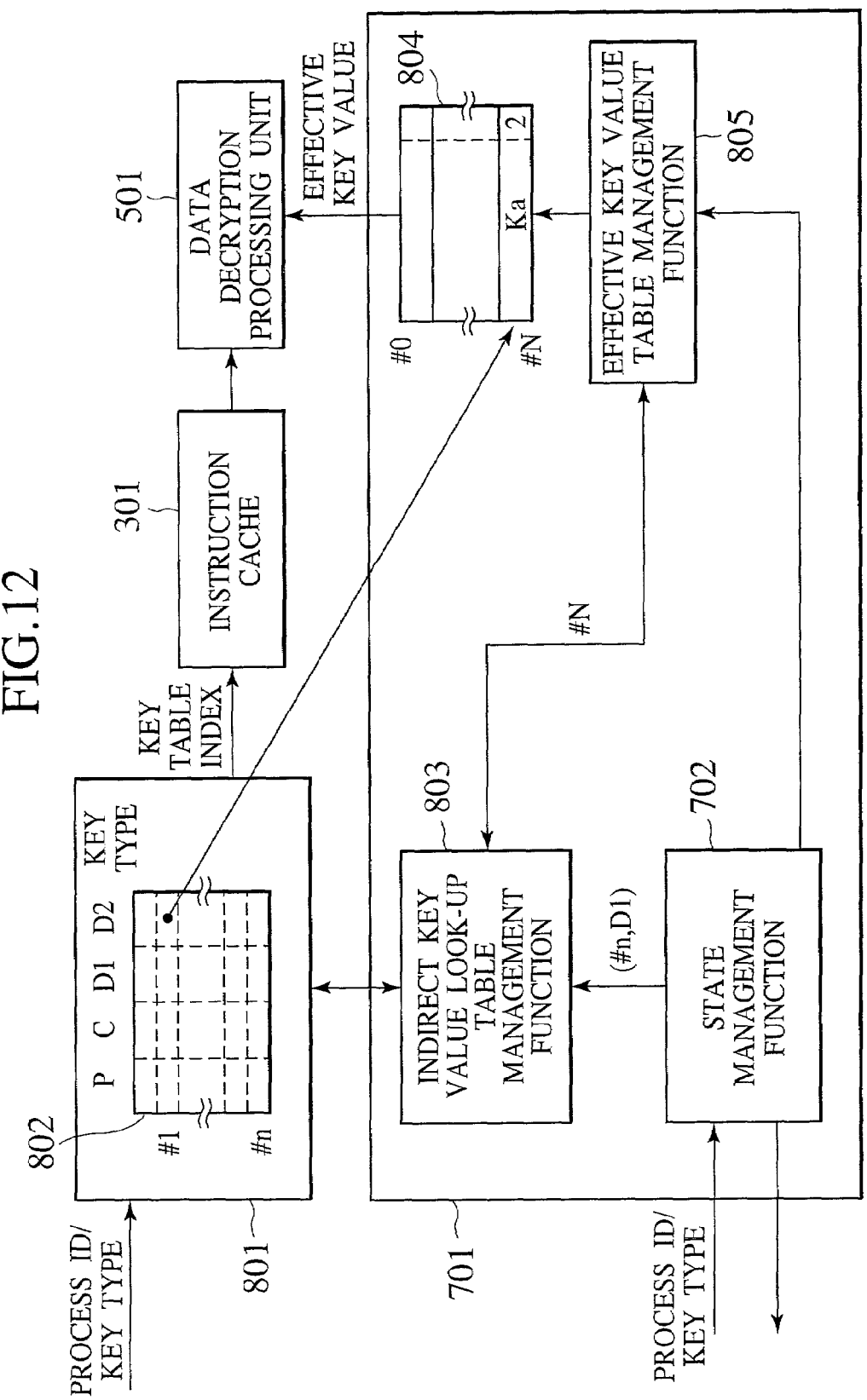
FIG. 12 is a diagram for explaining a key deletion processing by the key index conversion function and the key management unit of FIG. 9.
Figure 13:
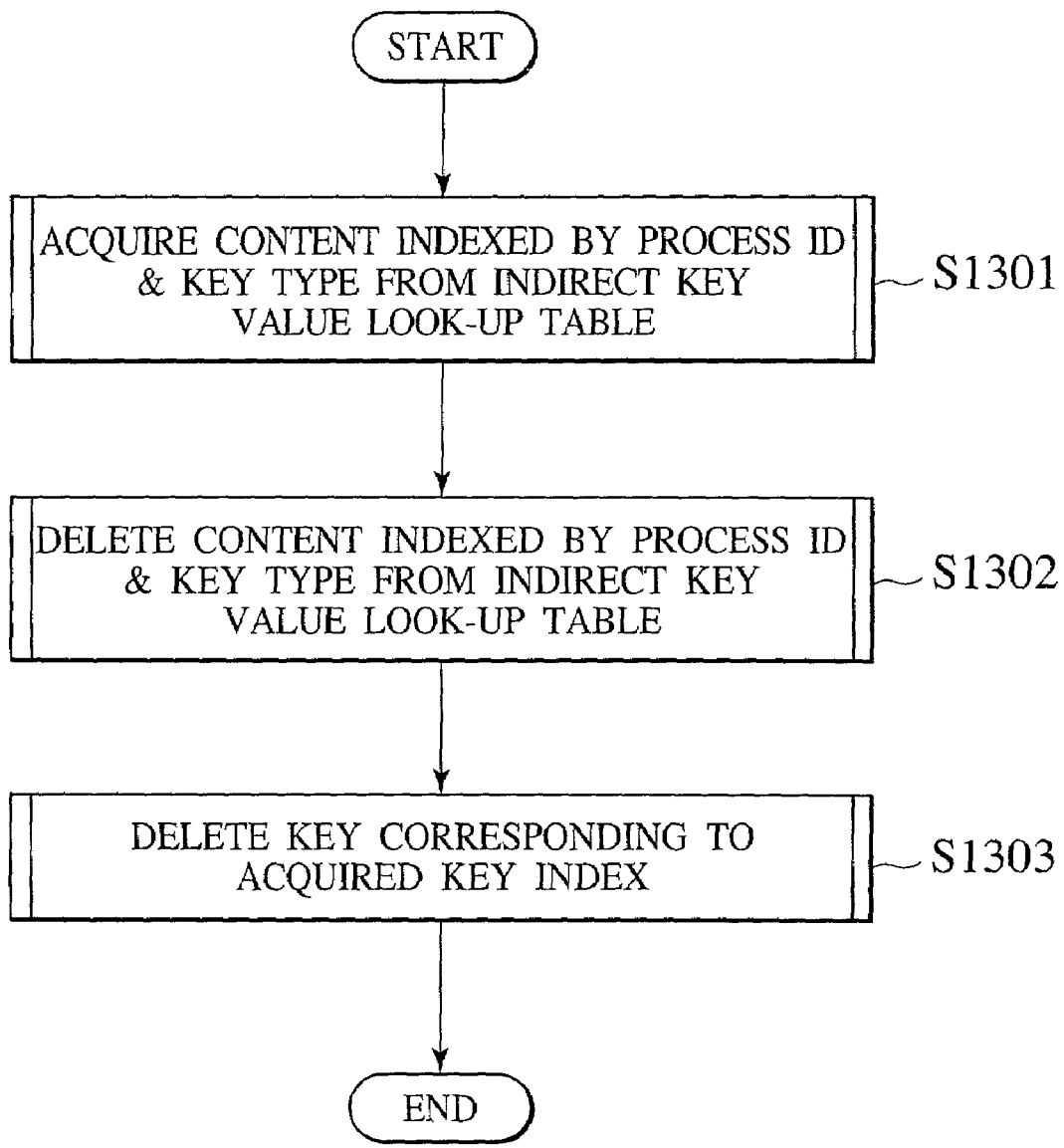
FIG. 13 is a flow chart showing an exemplary procedure for a key deletion processing in the microprocessor of FIG. 8.

FIG. 12 shows an exemplary operation at a time of the key entry deletion, and FIG. 13 shows an exemplary procedure for the key entry deletion processing.

The processor core 201 presents the process identifier and the key type (#n, D1) corresponding to the key to be deleted to the state management function 702. The state management function 702 presents the process identifier and the key type (#n, D1) to the indirect key value look-up table management function 803, and the indirect key value look-up table management function 803 acquires the key value table index #N from the table (step S1301) and rewrites the value to #0 at the same time (step S1302). The indirect key value look-up table management function 803 presents the key value table index #N to the effective key value table management function 805, to request the deletion (step S1303). The effective key value table management function 805 decreases a value of the look-up counter of #N from 2 to 1, and when the deletion is completed, this fact is notified to the state management function 702.

Referring now to FIG. 14 to FIG. 17, the fourth embodiment of a microprocessor according to the present invention will be described in detail. In the following, the differences from the second embodiment will be mainly described.

The fourth embodiment is directed to a process perpetuation control function and a safe feedback information saving function, based on the the saving of the effective key into the external memory.

In the microprocessor of the second embodiment, the key information (context key) for encrypting the context information and saving it into the external memory is maintained in a table 709 inside the processor. Here, the context key is updated at each occasion of the context saving so that the once saved context information cannot be re-utilized, and therefore it is possible to prevent an attack in which an attacker fraudulently replaces the context information with another context information of another process or the same process that was saved by the attacker at another timing.

However, the maintaining the context key inside the processor is associated with the following two problems. One problem is that a state in which the program has been executed cannot be ascertained even by a program developer when a trouble in the operation of the program is discovered, that is, the feedback to the program developer is impossible.

Another problem is that it is impossible to execute processes in excess of the number of the context key tables simultaneously or to continue the execution of the same process after the power of the processor is turned off once, so that it is rather inconvenient.

In particular, the latter problem implies a trade off relationship between the security for preventing the fraudulent process context replacement described above and the convenience of the user.

In the following, a way of resolving these two problems will be described.

Figure 14:
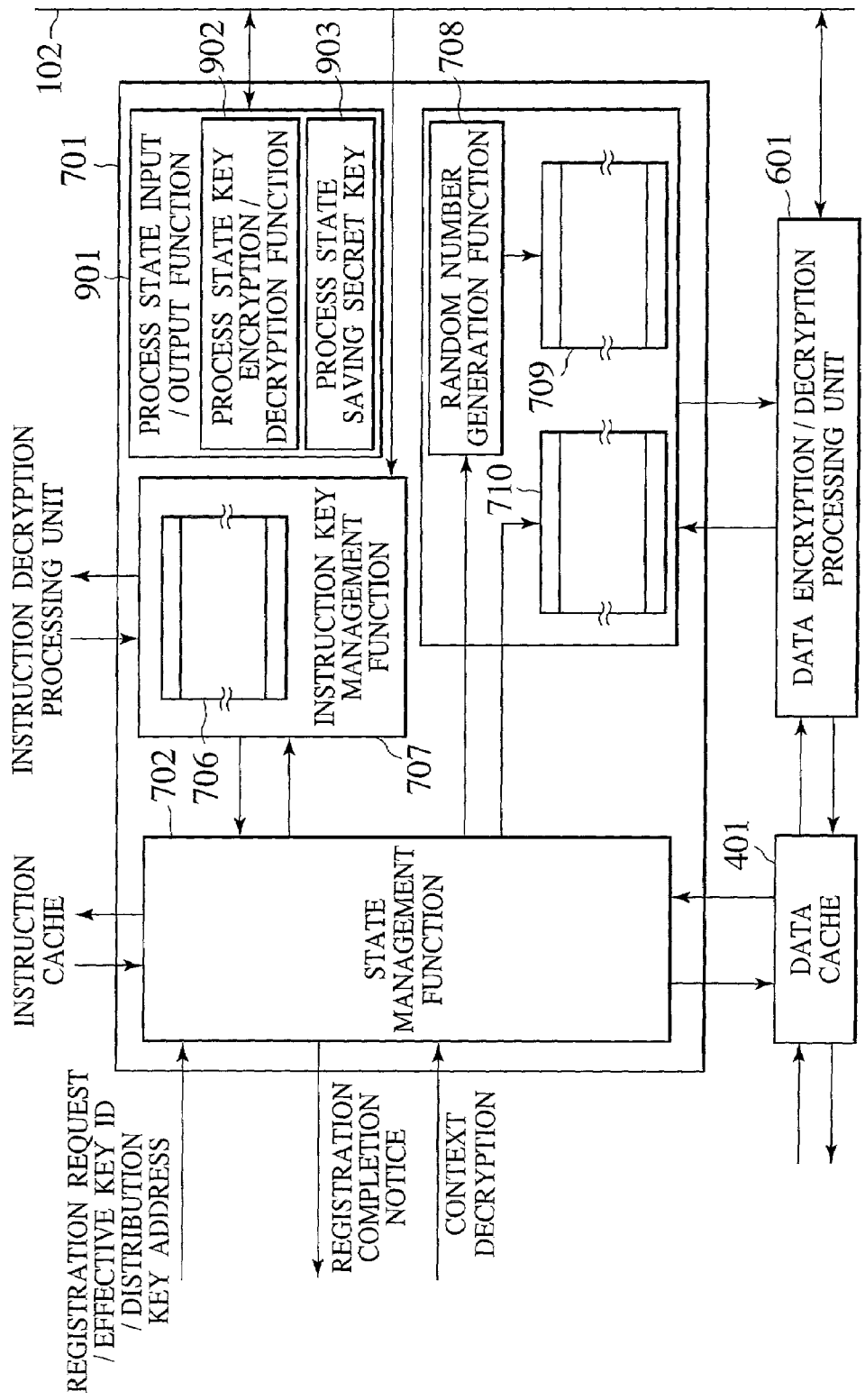
FIG. 14 is a block diagram showing an exemplary overall configuration of a microprocessor according to the fourth embodiment of the present invention.

FIG. 14 shows an exemplary overall configuration of the microprocessor according to the fourth embodiment. The configuration of FIG. 14 differs from that of FIG. 6 of the second embodiment in that a process state input/output function 901 is additionally provided. The process state input/output function 901 has a process state key encryption/decryption function 902 and a process state saving secret key 903. The process state key encryption/decryption function 902 provides an encryption/decryption function of the common key algorithm, and the process state saving secret key 903 is specific to the processor.

Figure 15:
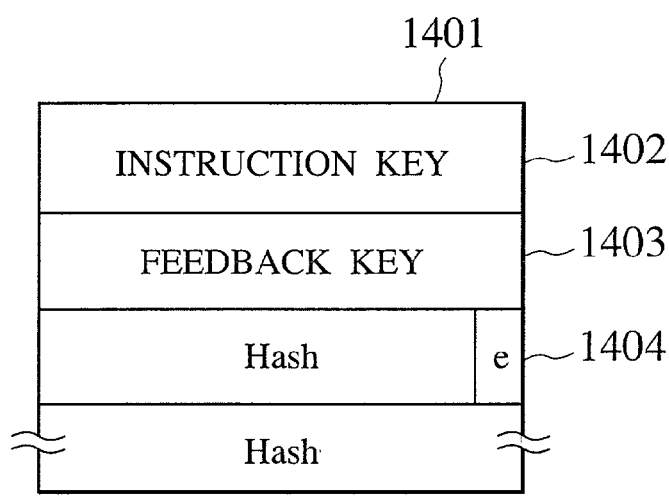
FIG. 15 is a diagram showing an exemplary format of a distribution key that can be used in the microprocessor of FIG. 14.
Figure 16:
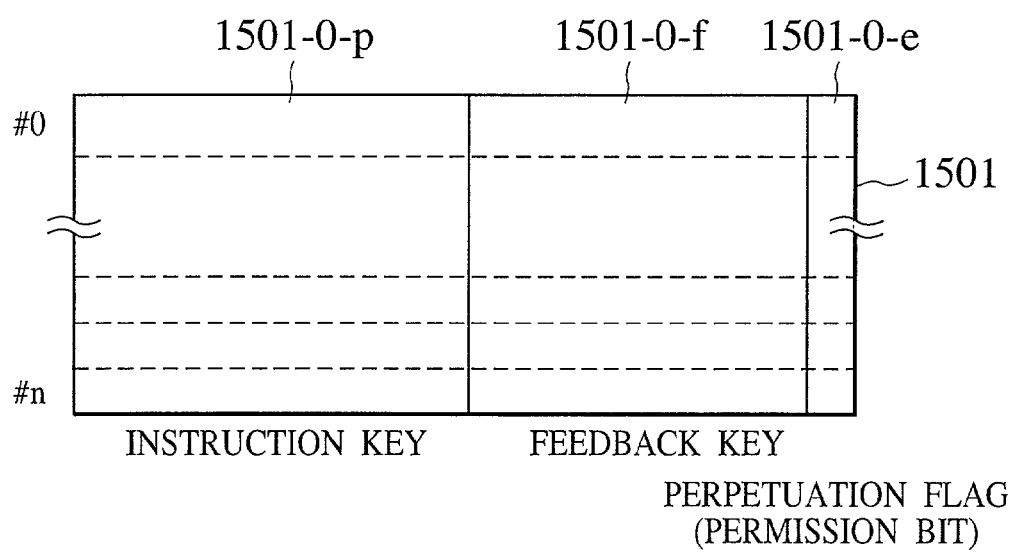
FIG. 16 is a diagram showing an exemplary format of an instruction key table that can be used in the microprocessor of FIG. 14.

In the fourth embodiment, an information in a format shown in FIG. 15 is encrypted by using the processor public key and distributed as a distribution key of the program. This information of FIG. 15 contains a feedback key and a perpetuation flag (perpetuation permission bit). This information of FIG. 15 also contains hash fields such that the registration of the key into the table will be stopped when hash values with respect to the instruction key, the feedback key and the perpetuation flag do not coincide. The distribution key is decrypted by using the secret key of the processor and saved into the instruction key table in a format shown in FIG. 16. The instruction table 1501 has entries #0 to #n, and each entry has an instruction key saving field 1501-0-p, a feedback key field 1501-0-f, and a perpetuation flag field 1501-0-e.

(Feedback Information)

The feedback key is a common key that is arbitrarily determined by the program developer. When the program (normally the OS) saves the feedback information of one process, a feedback information saving instruction is issued. It is assumed that the saving target process has its context saved and its execution interrupted. The feedback information saving instruction takes two operands including a process identifier and a saving target memory address. When the feedback information saving instruction is issued, the key information (instruction key, context key, data key) of the process is encrypted by using the feedback key, and saved at a specified address in the external memory of the processor as the feedback information.

The program developer who knows the feedback key can decrypt the feedback information and ascertain the state of the process at a time of the interruption, but the processor is not provided with a mechanism for recovering the key information from the feedback information. For this reason, the feedback information cannot possibly be used maliciously to give an incorrect state to the process, and it is impossible for the user who does not know the feedback key to identify the instruction key or the context key from the feedback information.

(Perpetuation Control)

Figure 17:
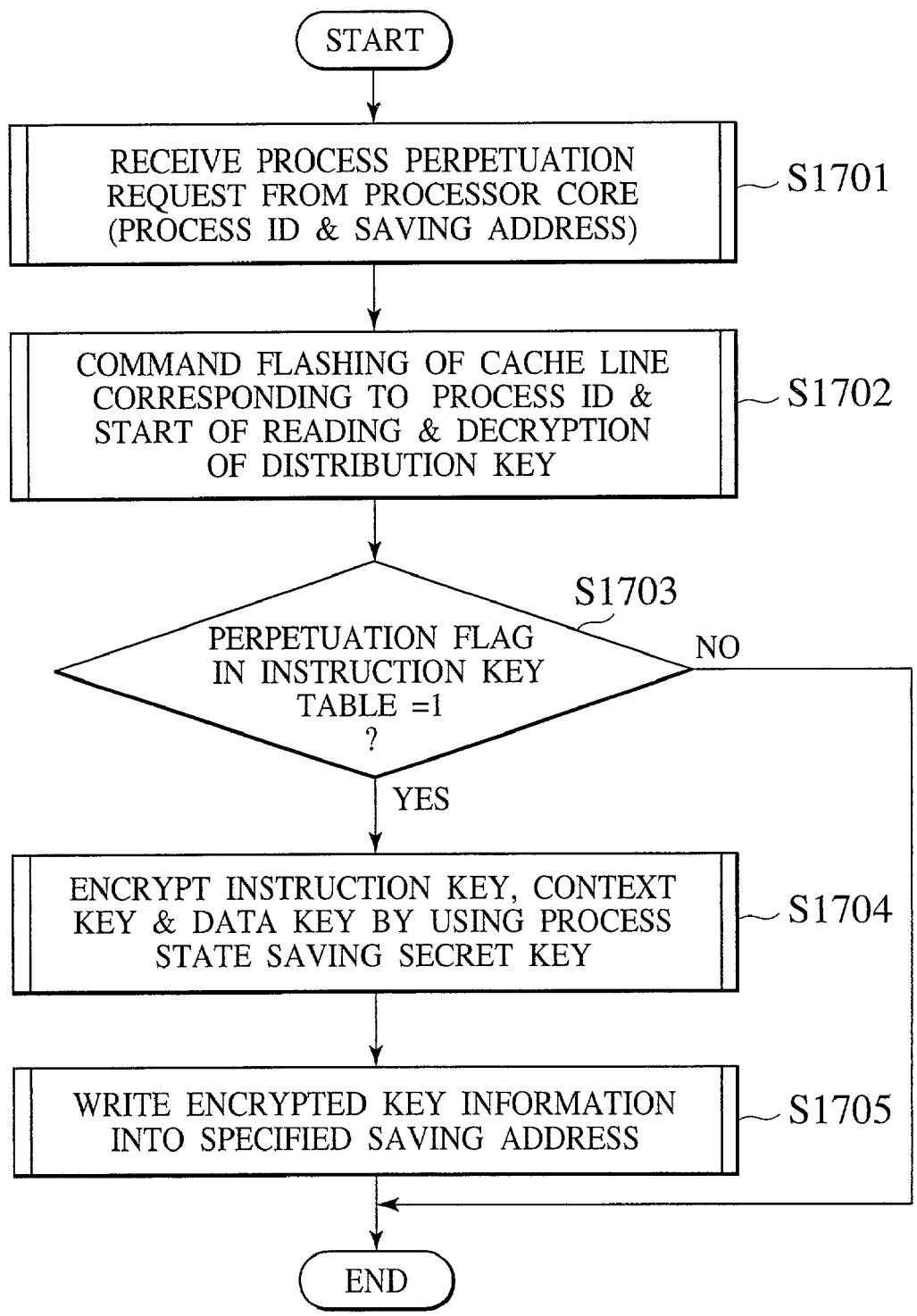
FIG. 17 is a flow chart showing an exemplary procedure for a key saving processing in the microprocessor of FIG. 14.

FIG. 17 shows an exemplary procedure for saving a process key for the perpetuation.

The perpetuation flag (perpetuation permission bit) of the distribution key is also information to be determined by the program developer. When the perpetuation is to be permitted by giving more weights to the convenience of the program, the program developer provides the distribution key with the perpetuation flag set to 1. When the perpetuation is not to be permitted by giving more weights to the security of the program, the program developer provides the distribution key with the perpetuation flag set to 0.

When the key information of one process is to be saved, a process state saving instruction having a process identifier and a saving target memory address as operands is issued. The process state input/output function 901 looks up the entry corresponding to the process identifier in the instruction key table, carries out the process state saving processing only when the perpetuation flag is 1, and causes the exception to occur when the perpetuation flag is 0 (steps S1701 to S1703).

In the saving processing, the key information (instruction key, context key, data key) of the process is encrypted by using the process state saving secret key 903 (step S1704), and written into the specified external memory address (step S1705).

When the saved key information of the process is to be recovered, a process state recovery instruction having a process identifier and a saving target memory address as operands is issued. The processor decrypts the process key by using the process state saving secret key 903, and registers it into the table corresponding to the specified process identifier. Thereafter, when a process resuming instruction is issued by specifying the corresponding context information and the process identifier, the execution of the process is resumed.

The saved process state is encrypted by using the process state saving secret key that is specific to the processor, so that the process state cannot be moved to the other processor, so that it is possible to reduce the possibility for the illegal use of the program The perpetuation flag is contained in the distribution key and protected by the encryption and the hashing, so that it is impossible to change the perpetuation flag unless a correct instruction key is known. Then, whether the process key information saving processing by the process state input/output function is permitted or not is judged according to the decrypted perpetuation flag, such that two conflicting factors of the perpetuation and the security of the process become controllable by the program developer who is a copyright owner of the program (in general).

As described, according to the present invention, it is possible to provide a microprocessor which is capable of improving the real time processing performance by shortening the unresponsive time due to the public key processing time at a time of the initial registration in the cache memory management procedure.

Also, according to the present invention, it is possible to provide a microprocessor which is capable of realizing the safe management of tags used in the cache memory access control.

Also, according to the present invention, it is possible to provide a microprocessor which has a program decryption function that can realize the efficient instruction execution while also making it difficult to estimate the program encryption key by chaining.

Also, according to the present invention, it is possible to provide a microprocessor which is capable of improving the processing efficiency when a plurality of processes shares data encrypted by using the identical encryption key.

Also, according to the present invention, it is possible to provide a microprocessor which has a context saving function that can meet the conflicting requirements regarding the convenience due to the safe program utilization and the security of the secret, according to the intention of a program provider.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, various functions of the microprocessor of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A microprocessor internally having a secret key specific to the microprocessor that cannot be read out to an external device, the microprocessor comprising:
   a processor core configured to execute a key registration instruction in which a registration request with an address of a distribution key of a program and a program identifier that identifies a program including plaintext instructions and encrypted instructions is issued, and to execute instructions of another program during a key registration based on the registration request, the distribution key being obtained in advance by encrypting an instruction key specific to the program by using a public key corresponding to private key, the encrypted instructions being obtained by encrypting instructions by using the instruction key;
   an instruction cache memory configured to store a cache line containing a part of instructions of a program in correspondence to a program identifier, and to permit reading of the cache line only when the program identifier stored in correspondence to the cache line coincides with a program identifier received along with a program reading request from the processor core; and
   a key management unit configured to, when receiving the registration request with the address of the distribution key and the program identifier, carry out the key registration, wait for a completion of an invalidation of the cache line corresponding to the program identifier included in the registration request, to notify a completion of the key registration to the processor core asynchronously by interruption when the key registration and the invalidation are both completed to enable the program with respect to the key registration request to be executed, the key registration being carried out by reading out the distribution key from an external memory based on the address thereof sent from the processor core, to decrypt the distribution key by using the secret key to obtain the instruction key, and to register into a key table the instruction key in correspondence to the program identifier sent from the processor core, the invalidation being carried out by invalidating the cache line stored in correspondence to the program identifier on the cache memory when the instruction key corresponding to the program identifier is registered in the key table,
   wherein the processor core starts to execute the program with respect to the registration request by using the corresponding instruction key after receiving the notification of the completion of the key registration from the key management unit.

2. The microprocessor of claim 1, further comprising:
   an instruction decryption processing unit configured to decrypt the encrypted instructions of the program read out from the external memory, by using the instruction key registered in correspondence to the program identifier by the key management unit, according to a chain information indicating chain relationships among encryption blocks in units of which the encrypted instructions are encrypted.

3. The microprocessor of claim 1, wherein the key management unit is also configured to register a data key to be used in encrypting/decrypting data for the program in correspondence to the program identifier into the key table.

4. The microprocessor of claim 3, wherein the key table stores a plurality of instruction keys or data keys which are indexed by key value indexes, and the microprocessor further comprises:
   a key index conversion unit configured to convert a set of a program identifier and a key type identifier received from the processor core into a corresponding key value index; and
   a decryption processing unit configured to decrypt encrypted instructions or data of a program specified by the program identifier received from the processor core and read out from the external memory, by using an instruction key or a data key indexed by the corresponding key value index obtained by the key index conversion unit.

5. The microprocessor of claim 4, wherein the key index conversion unit converts more than one set of a program identifier and a key type identifier into an identical key value index.

6. The microprocessor of claim 4, further comprising:
   a cache memory configured to store a part of instructions or data of programs by using key value indexes obtained by the key index conversion unit as cache tags.

7. The microprocessor of claim 1, wherein the key management unit is also configured to register a context key to be used in encrypting/decrypting context for the program in correspondence to the program identifier into the key table.

* * * * *